United States Patent
Hsu et al.

(10) Patent No.: US 7,307,411 B1
(45) Date of Patent: Dec. 11, 2007

(54) METHOD FOR SIGNAL EXTRACTION IN A UNIVERSAL SENSOR IC

(75) Inventors: George Hsu, San Jose, CA (US); Joseph F. Miller, Santa Rosa, CA (US)

(73) Assignee: Sensor Platforms, Inc., Santa Rosa, CA (US)

( * ) Notice: Subject to any disclaimer, the term of this patent is extended or adjusted under 35 U.S.C. 154(b) by 0 days.

(21) Appl. No.: 11/642,479

(22) Filed: Dec. 19, 2006

Related U.S. Application Data

(62) Division of application No. 11/144,975, filed on Jun. 3, 2005, now Pat. No. 7,285,964.

(51) Int. Cl.
  *G01R 17/02* (2006.01)
(52) U.S. Cl. .................. 324/76.13; 324/606; 324/607; 702/193
(58) Field of Classification Search ................ 324/603, 324/606, 607, 610, 707; 702/193
  See application file for complete search history.

(56) References Cited

U.S. PATENT DOCUMENTS

| | | | | |
|---|---|---|---|---|
| 4,263,494 A | * | 4/1981 | Martin | .................... 219/69.16 |
| 4,516,770 A | * | 5/1985 | Brookes et al. | ................ 473/23 |
| 4,641,246 A | * | 2/1987 | Halbert et al. | ............... 341/163 |
| 5,321,401 A | * | 6/1994 | White | ......................... 341/147 |
| 5,637,994 A | * | 6/1997 | Carder | ..................... 324/76.13 |
| 5,893,049 A | * | 4/1999 | Reggiardo | .................... 702/71 |
| 6,304,828 B1 | * | 10/2001 | Swanick et al. | ............. 702/107 |
| 2003/0149907 A1 | * | 8/2003 | Singh et al. | ................. 713/500 |
| 2003/0164739 A1 | * | 9/2003 | Bae | ........................... 331/36 C |
| 2004/0199674 A1 | * | 10/2004 | Brinkhus | ........................ 710/1 |

\* cited by examiner

*Primary Examiner*—Anjan Deb
(74) *Attorney, Agent, or Firm*—Fernandez & Associates, LLP

(57) ABSTRACT

A apparatus and method for creating a universally usable and configurable sensor platform which is used in conjunction with various sensor and sensing elements to sense and measure environmental conditions which incorporates inputs from multiple sensors 6-9 and 12-14. The apparatus incorporates an oscillator 3 which provides a signal whose frequency varies according to the inputs from sensors 6-9 and 12-14 in combination with a microprocessor 1. A cordic block 61 allows for supplemental calculations of trigonometric operations and functions. An output unit 2 converts the signals received from microprocessor 1 into a variety of serial protocols.

9 Claims, 26 Drawing Sheets

METHOD FOR SIGNAL EXTRACTION IN A UNIVERSAL SENSOR IC

CROSS-REFERENCE TO RELATED APPLICATIONS

This application is a divisional of application Ser. No. 11/144,975 filed Jun. 3, 2005.

TECHNICAL FIELD

The present invention relates to sensor data acquisition systems and methods. More particularly, the present invention relates to methods and apparatus for connecting to a wide variety of different sensors and performing signal processing to give useful information from the outputs of the sensors.

BACKGROUND ART

As the variety and number of sensor elements continue to be developed for the automotive, consumer, industrial and medical markets, the plethora of signal drive, acquisition and processing solutions have also likewise increased in direct proportion. Low volume applications are generally limited to custom circuits of discrete active and passive electronic components where the elements of cost, size, power consumption and reliability are poorly optimized. In higher volume applications, where the development of semi-custom or fully custom application specific integrated circuits (ASIC) can be justified from a cost and risk standpoint, the overwhelming practice is to develop specific solutions for specific sensor types and their specific applications. This practice is very inefficient from the standpoint of time-to-market, development cost, risk and part price. The development cycle of even the simplest ASIC generally requires at least one year or more of development time in addition to the investment of millions of dollars. At the end of this development effort, there is no guarantee that the ASIC will work to the required specifications for the particular sensor application.

Sensor ASICs are some of the most difficult designs to realize properly, especially when they are combined with digital logic functionality, as is almost always necessary for the interface requirements into a larger system. Such mixed signal designs are particularly susceptible to crosstalk injected from the digital into the analog sections of the ASIC which severely degrades sensor performance. Having a well characterized IC based sensor platform is highly desirable, as once its characteristics have been quantified, understood and optimized, there is no need to re-invent it for use with other sensors. In addition to the obvious time and cost savings gained through the elimination of another custom ASIC development, the risk of a part not working is almost entirely mitigated. In the world of ASIC designs, modeling and predictive tools are now commonly available to avoid costly mistakes when implementing a new IC. However, such tools are almost exclusively limited to the domain of digital logic. There are very few analog modeling tools that effectively capture analog part performance, especially when mixed with digital logic. This is especially the case as silicon process geometries continue to shrink. Layout, isolation, leakage, and many other unquantifiable electrical interactions stand as critical issues in analog and mixed signal designs and remain more an area of art than science. No modeling tools exist on a system level for mixed signal ASIC design as the high complexities and subtle nuances of analog and digital interactions are impossible to adequately model. Therefore, the risk of failure or suboptimal performance abounds during design implementation.

Therefore, the design cycle of a successful mixed signal sensor ASIC is mostly a matter of successive iterations of trial-and-error, involving a tremendous amount of tedious "grunt work" as each new ASIC "spin" has to be fully characterized and then the problems must be understood and fixed. Often, this becomes a series of very expensive controlled experiments, fixing all parameters in place except for one, and then seeing whether the performance converges or diverges. Add to this, the possibilities of digital glitches occurring, and it seems miraculous that any mixed signal ASIC can ever make it into production at all. As can be inferred from this description, it would be highly advantageous to have a single known working platform that can form the basis for all sensor signal drive, acquisition and processing variants. Once working well, this proverbial "wheel" would not have to be re-invented for subsequent applications, and a more gradual evolution of feature sets can then be more safely and efficiently achieved from such a solid base.

In theory, the universal platform approach makes a lot of sense and would seem to have a great deal of attractiveness for many within the sensor industry. But in reality, until the present invention, this prospect has remained mostly a "Holy Grail"—ideal but unachievable. The problem for the sensor market stems from the fact that for any given physical parameter that is desired to be measured, there exist many different possible sensor element solutions, all with correspondingly different electrical characteristics. When compounded with the fact that there exists sensors that can measure just about every known physical parameter-pressure, acceleration, gas, chemical, magnetism, force, tilt, temperature, light, proximity, rate, torque, humidity, etc.—it becomes readily apparent that having a single signal drive, acquisition and processing platform, however desirable, is not a trivial undertaking. Each of the above sensor categories (in addition to others not enumerated), can have solutions where the sensor element has an electrical change in the form of resistance, capacitance, inductance, voltage, or current. Couple this with the fact that the base impedances can be at extreme ends of a large spectrum and can have signal levels just as diverse, and the challenge of creating a universal sensor platform seems insurmountable.

The sensor market is in desperate need of a standardized platform that can facilitate and simplify the effort necessary to make any sensor element work for a user's intended application. Presently the options for sensor signal extraction are typically limited to Wheatstone bridge configurations where the bridge signal is buffered and amplified by an instrumentation amplifier whose resulting output signal is fed into an analog-to-digital converter. Such a configuration limits the type and breadth of sensor elements that can be driven and operated as the impedances, signal voltage levels, and dynamic ranges between different sensor elements are vastly different. Additionally, it is the case that an inductive sensor needs a much different signal extraction circuit than does a resistive or capacitive sensor element. Clearly, there is a need for the present invention.

DISCLOSURE OF THE INVENTION

The present invention uniquely addresses this issue of universality, thereby allowing the manifold advantages enumerated above. Not only does it simply and elegantly achieve such universality, but it also achieves it in manner that makes the solution inherently lower cost than traditional methods of signal drive and analog-to-digital conversion. It also consists of such little traditional analog circuitry that it is the only technological approach that has the capability of being transitioned to ever smaller silicon process geometries, in order to take advantage of cost, size and power consumption improvements. The present invention is a very unique approach for extracting measurable signals from sensor elements in that it is inherently more of a digital electronic solution as opposed to an analog one. As digital silicon processing techniques migrate to ever smaller line widths and geometries, i.e. 0.13 micron, 90 nm, and even 70 nm, the analog world has not been able to utilize and leverage such advances. Typical analog technologies have not successfully crossed the 0.35 micron threshold, especially for sensor applications. This limits the cost efficiency that such parts could enjoy if they were able to do so. The present invention makes it much more feasible to leverage such trends in the shrinking of silicon process geometries, thereby enabling similar or even improved performance, at ever lower costs and smaller part sizes.

The present invention is a general "one-size-fits-all" circuit that can work with any resistive, capacitive, inductive, or voltage based sensor element. This allows for a single IC that can be used across almost any sensor application. The sensor element is included as a timing element in a simple, rail to rail output, Schmitt trigger oscillator. As the sensor element's impedance varies in response to its measurand it causes the time constant of the Schmitt trigger oscillator to also vary in proportion. This causes the oscillator to output a digital-logic-level-compatible square-wave whose frequency varies as a function of the sensor elements measured. This frequency varying digital output signal is then fed into a very high resolution digital period counter in order to extract a numerical value representative of the sensor element's reading.

The advantages are numerous, including the fact that there are very few analog stages in such a topology, which keeps the IC small and low cost. Additionally, the time constant of the sensor can be matched up with a fixed impedance counterpart so that a broad variety of different sensor impedances can be accommodated. For instance, if the sensor element is a capacitive pressure sensor, it can be matched up with a resistor such that the total RC time constant of this RC-Schmitt Trigger oscillator can be centered about any conveniently desired oscillation frequency. The same applies to inductive, resistive or, in a slightly different topology, voltage-based sensors as well.

Another advantage of such an approach is that the bit resolution of the signal conversion can be dynamically controlled. It becomes simply a matter of sampling for longer or shorter periods of time. Also, because multiple cycles of the sensor oscillator are taken in order to extract the signal, the noise characteristics are very favorable since such averaging naturally results in digital low pass filtering. Such filtering is accomplished right at the sensor stage, before the signal is acquired. FIGS. 2-7, 8, 9, 10, 11, 12A, 12B, 13A, 13B, 14, 15A, 15B, 15C, and 15D show the various topologies of hooking up different sensor elements of various electrical characteristic types.

BRIEF DESCRIPTION OF THE DRAWING(S)

For a better understanding of the present invention, reference is made to the below referenced accompanying Drawing(s). Reference numbers refer to the same or equivalent parts of the present invention throughout the several figures of the Drawing(s).

Figure 11A:
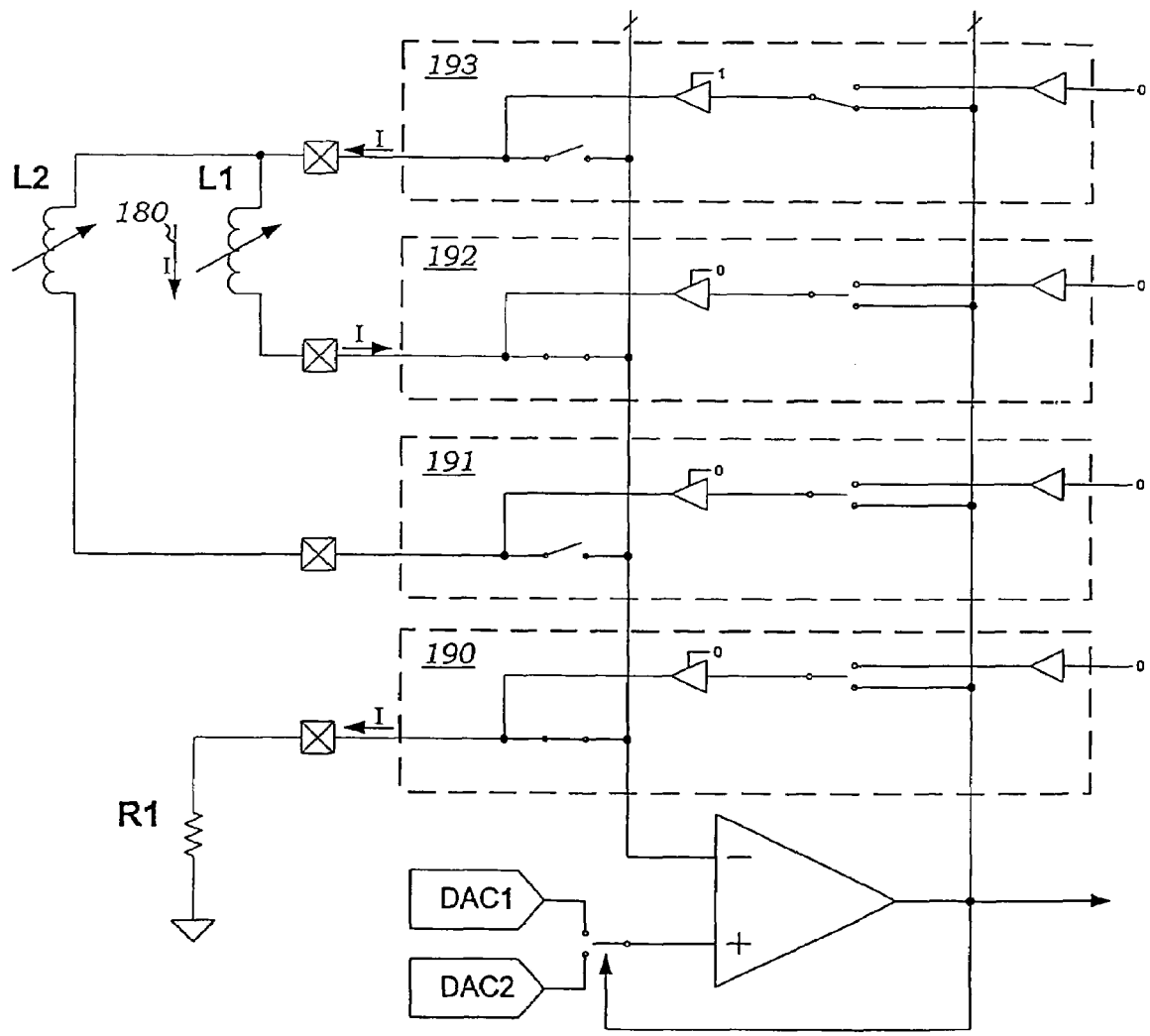
FIG. 11A is a block diagram of a 2-axis inductive magnetometer with bi-directional biasing of the FIG. 1 embodiment, in accordance with the present invention.
Figure 11B:
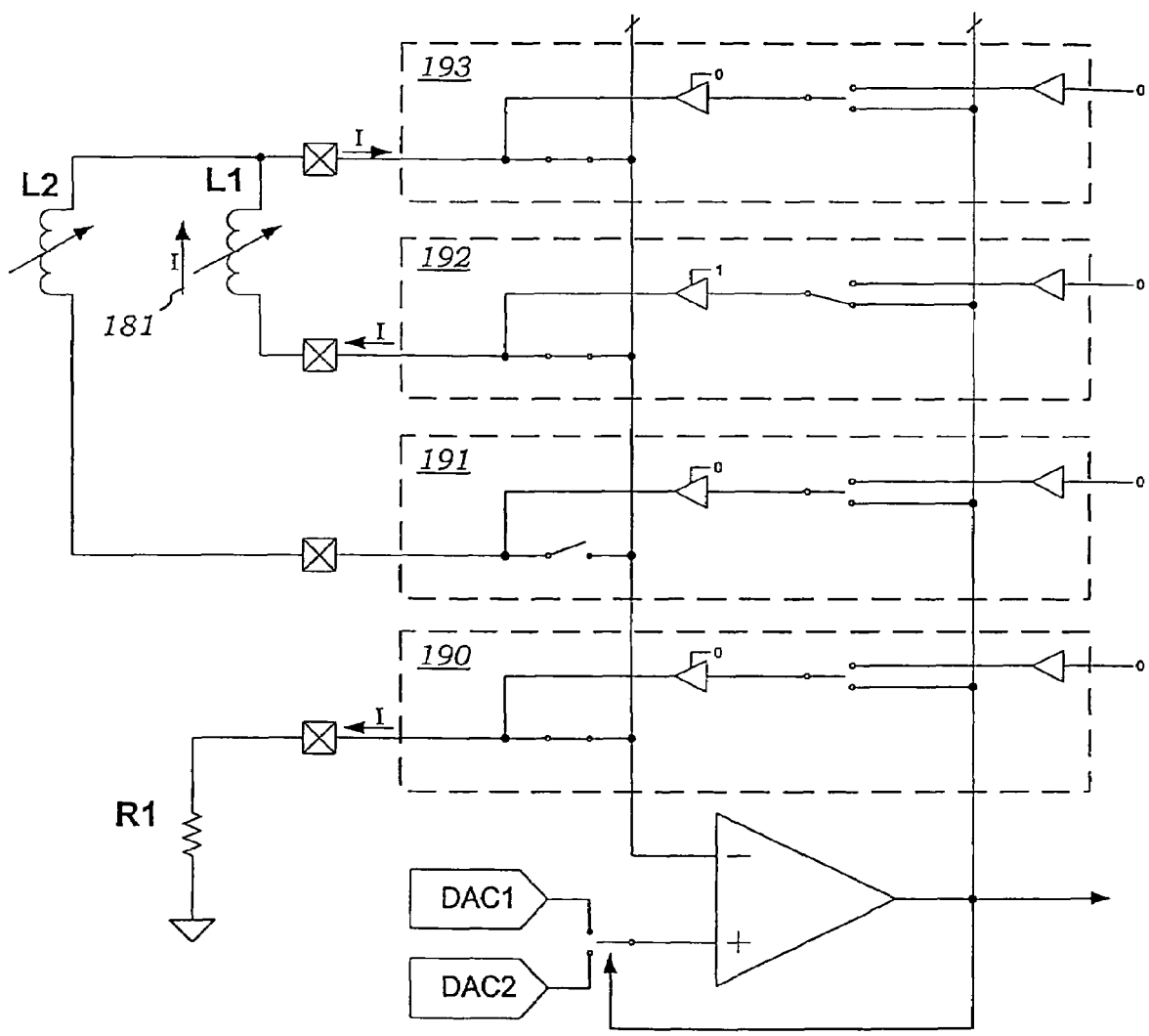
Figure 11C:
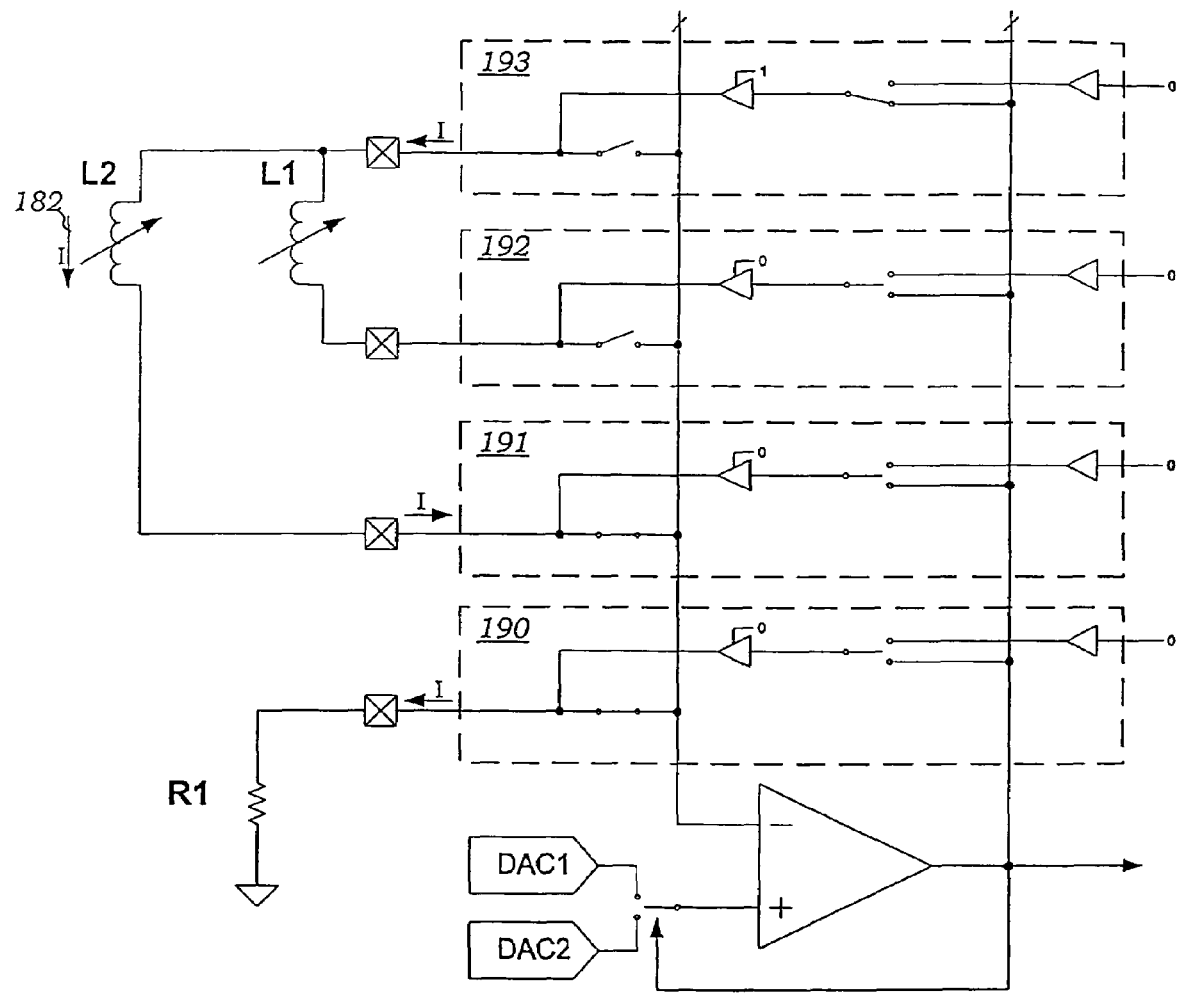
Figure 11D:
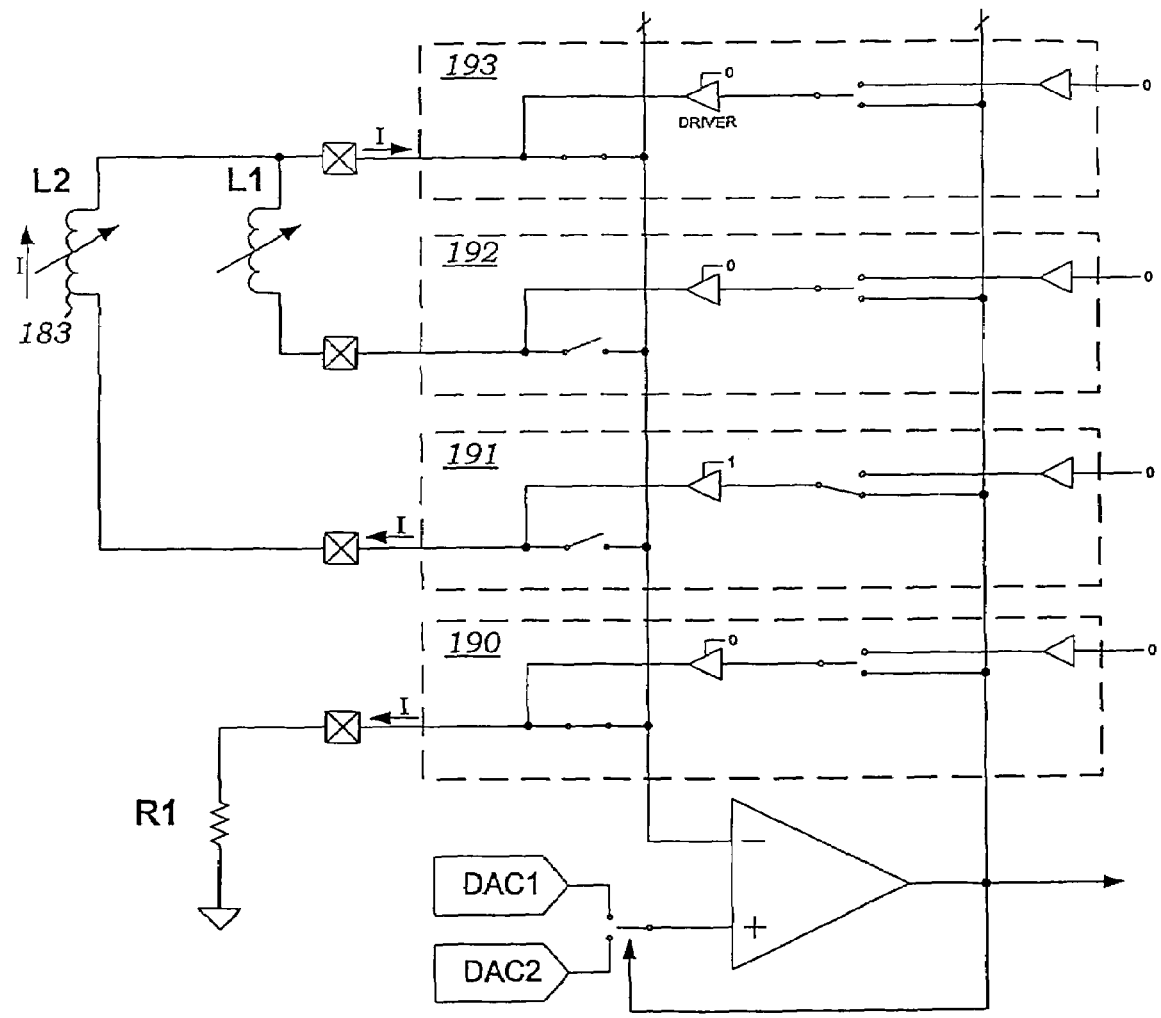

FIG. 11B is a partial diagram of the FIG. 1 embodiment.
FIG. 11C is a partial diagram of the FIG. 1 embodiment.
FIG. 11D is a partial diagram of the FIG. 1 embodiment.

Figure 12A:
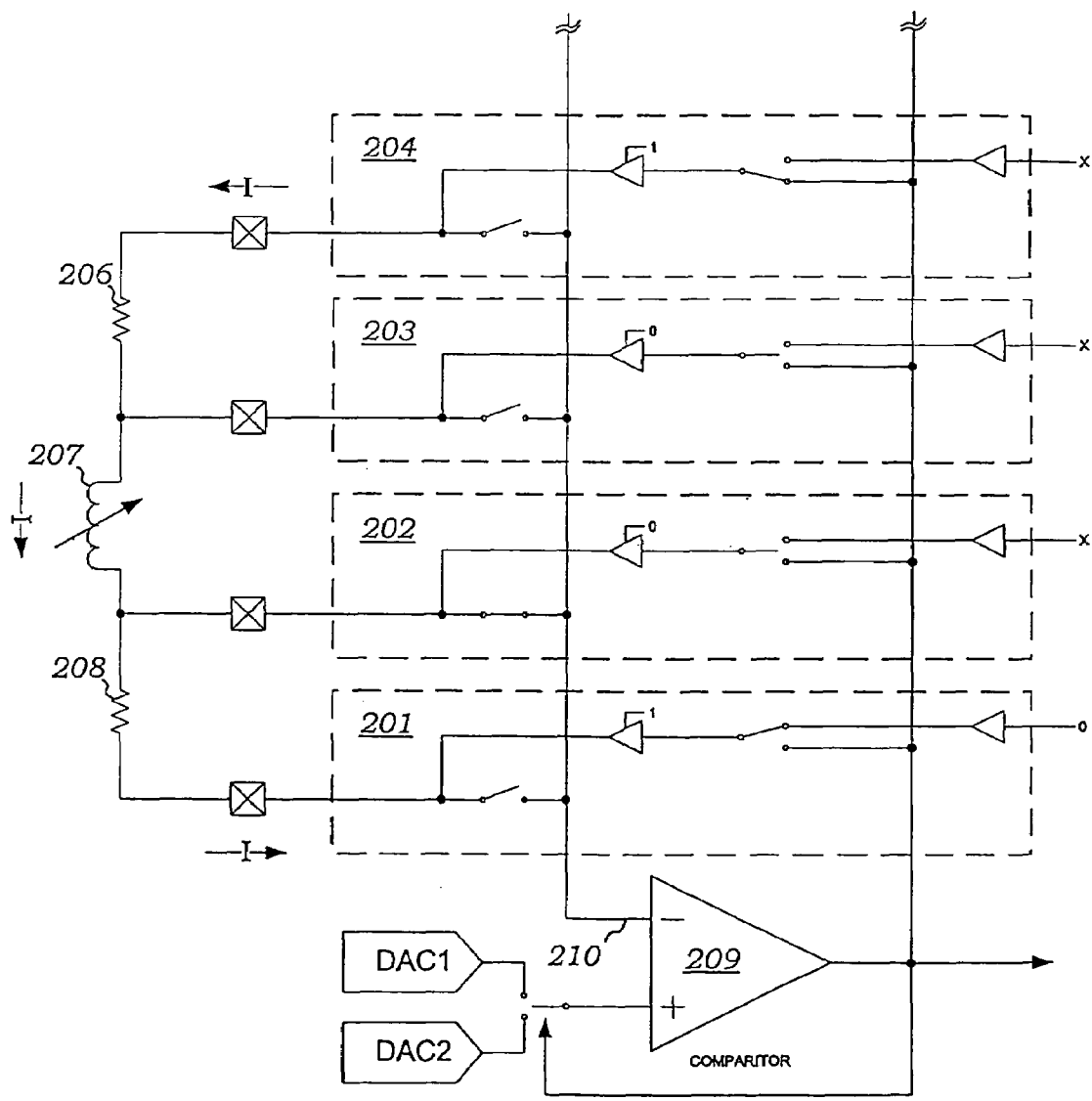

FIG. 12A shows an alternative method of configuring the device I/O channels to a sensor with forward bias current.

Figure 12B:
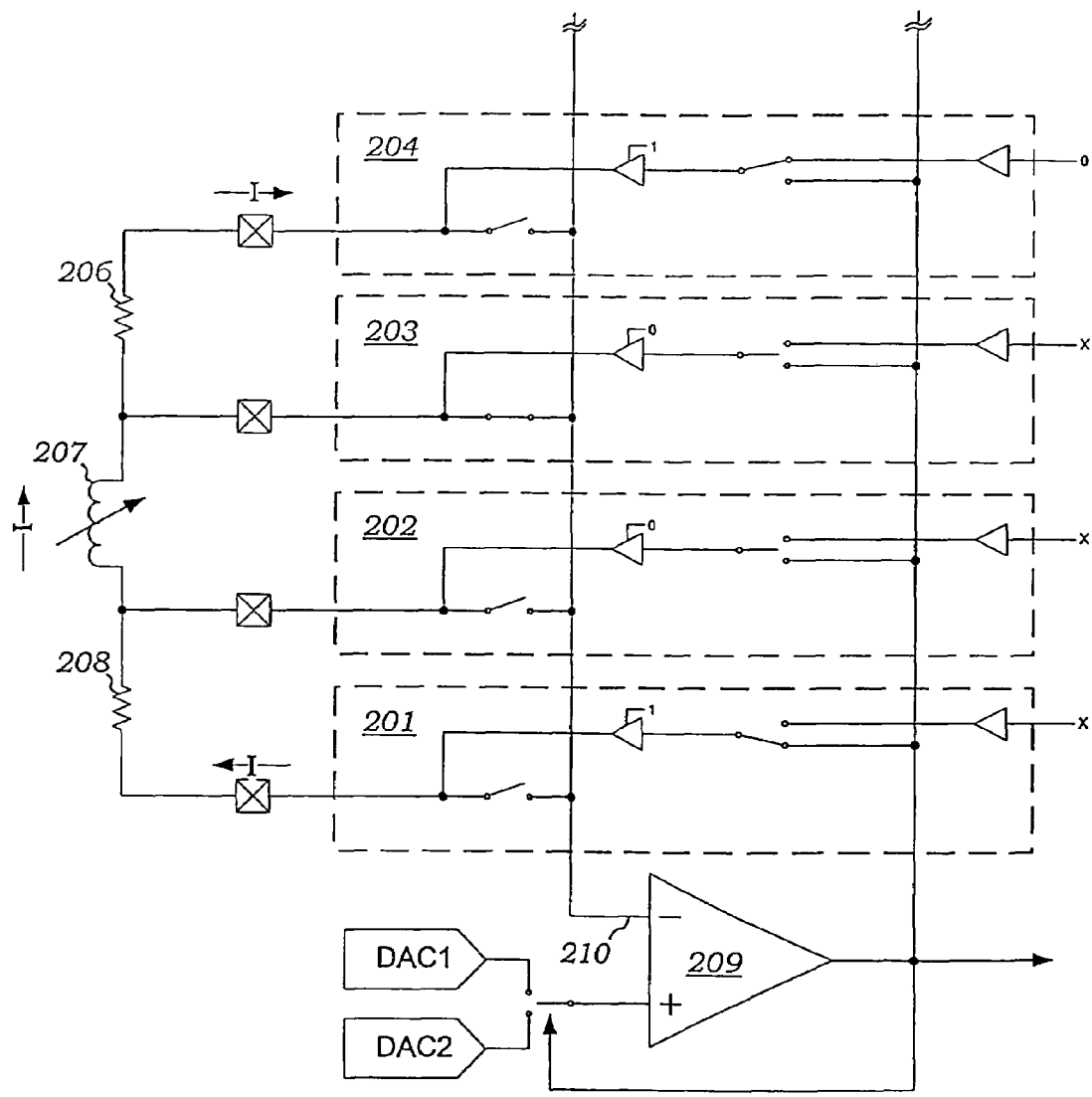

FIG. 12B shows an alternative method of configuring the device I/O channels to a sensor with reverse bias current.

Figure 13A:
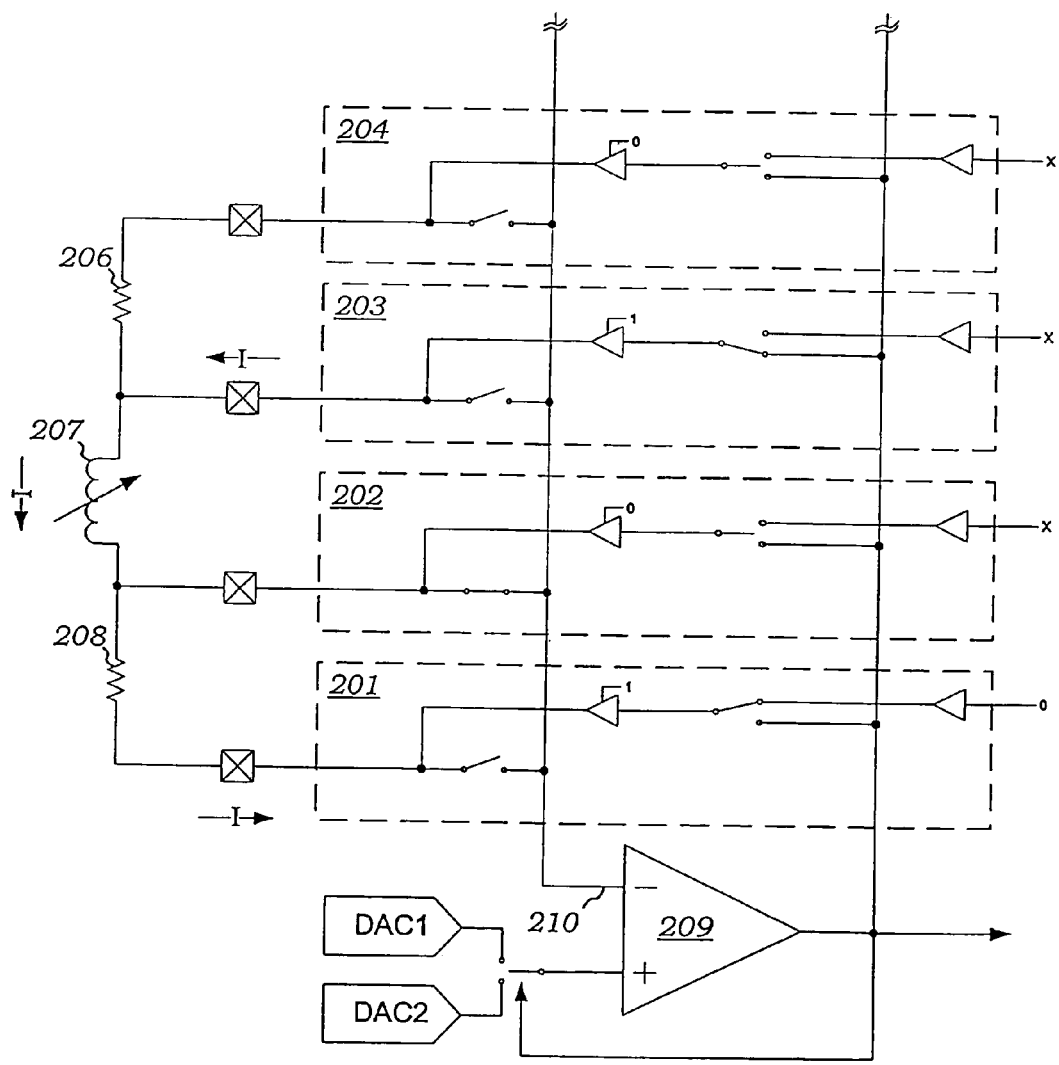

FIG. 13A shows an alternative method of configuring the device I/O channels to a sensor with forward bias current.

Figure 13B:
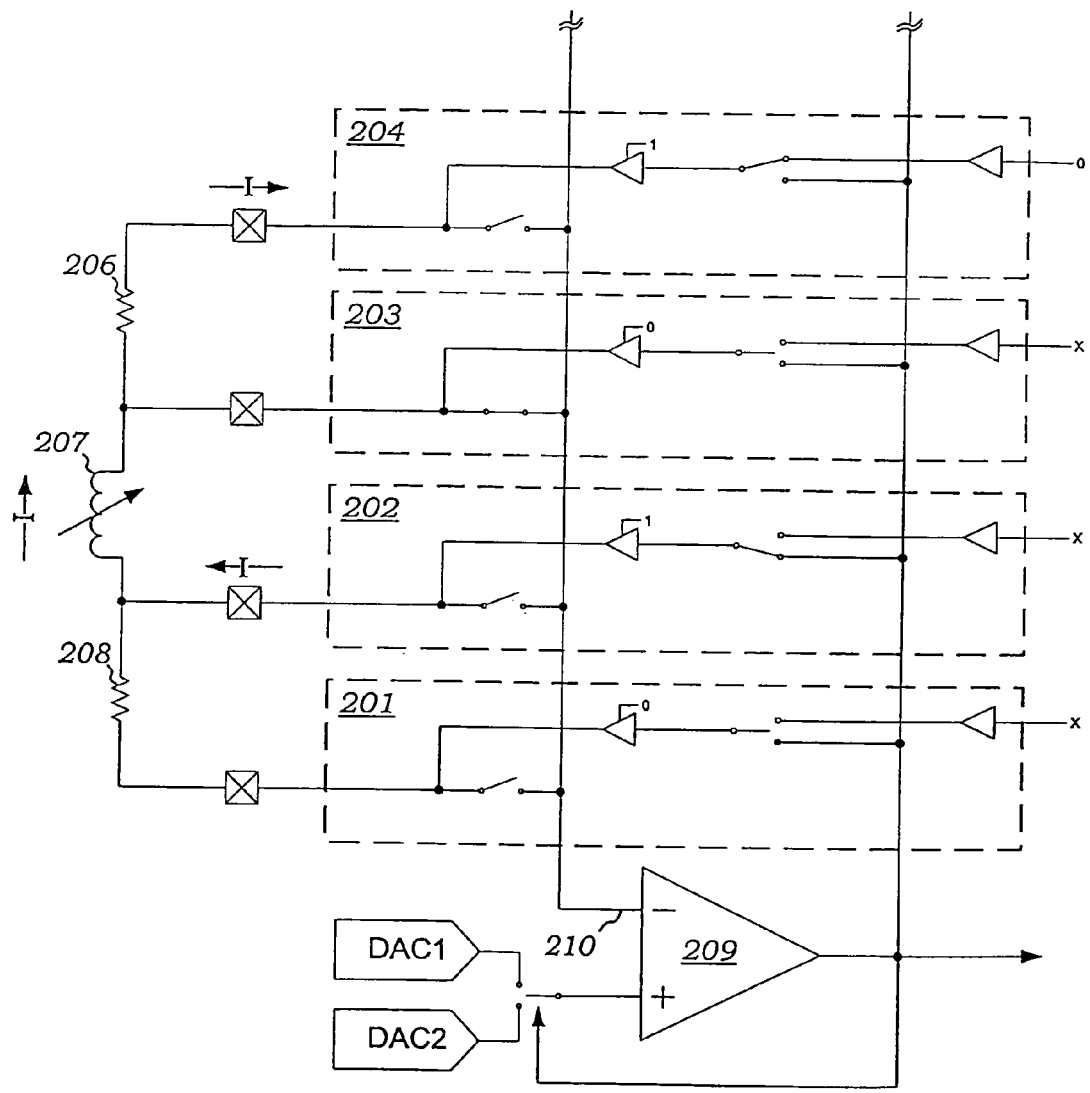

FIG. 13B shows an alternative method of configuring the device I/O channels to a sensor with forward bias current.

Figure 14:
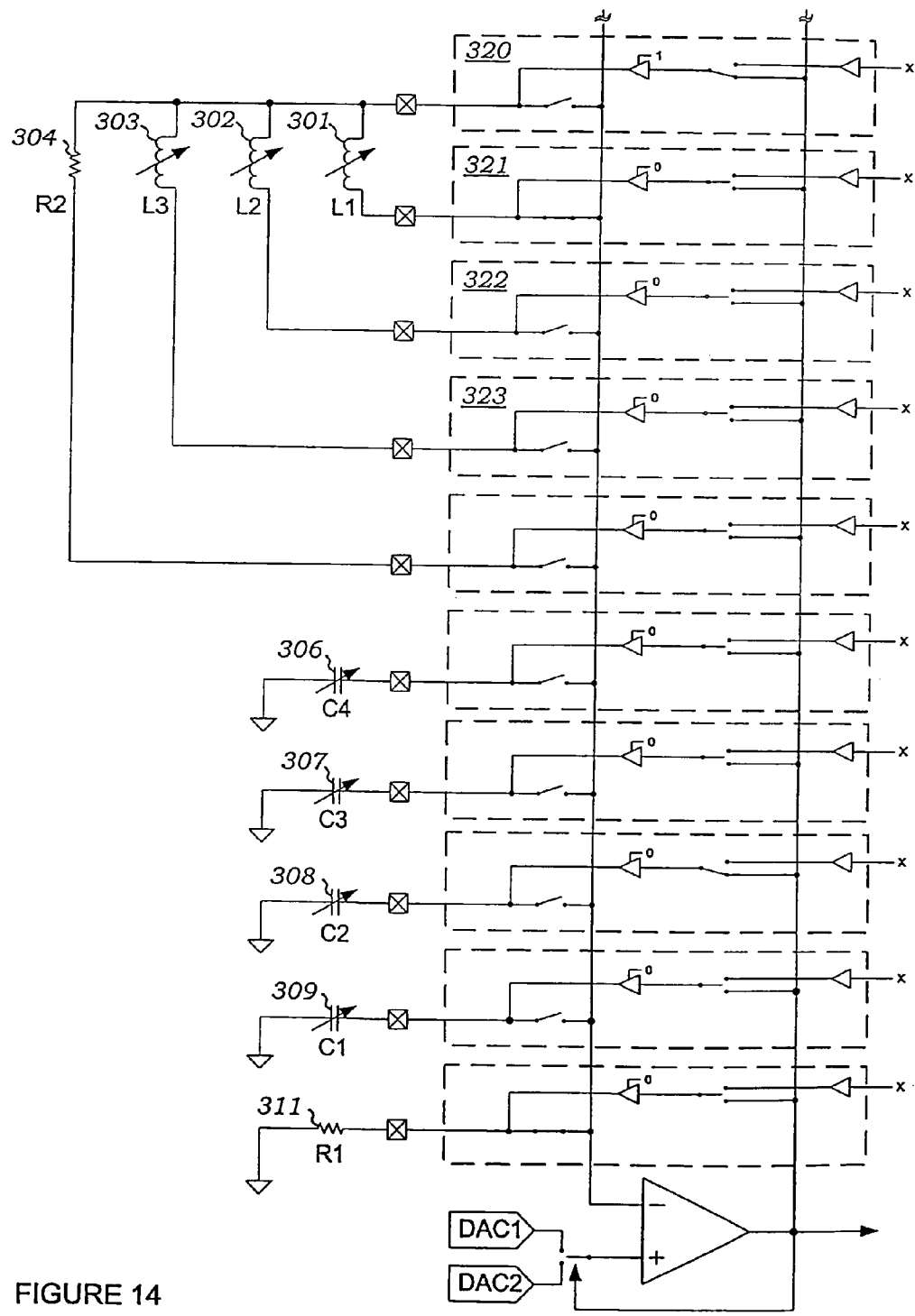

FIG. 14 shows an alternative method of configuring the device I/O channels to a sensor with multiple sensor elements of mixed types.

Figure 15A:
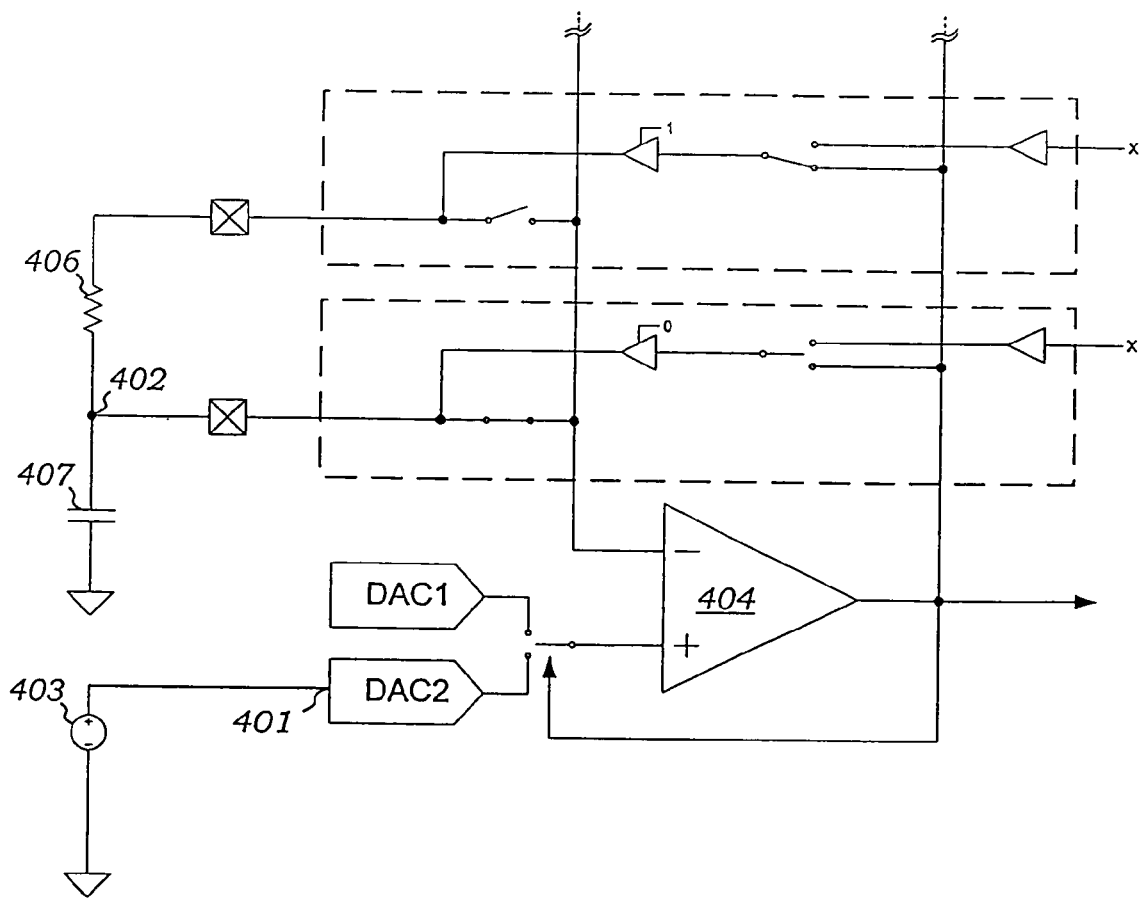

FIG. 15A shows an alternative method of configuring the device I/O channels for a voltage-based sensor.

Figure 15B:
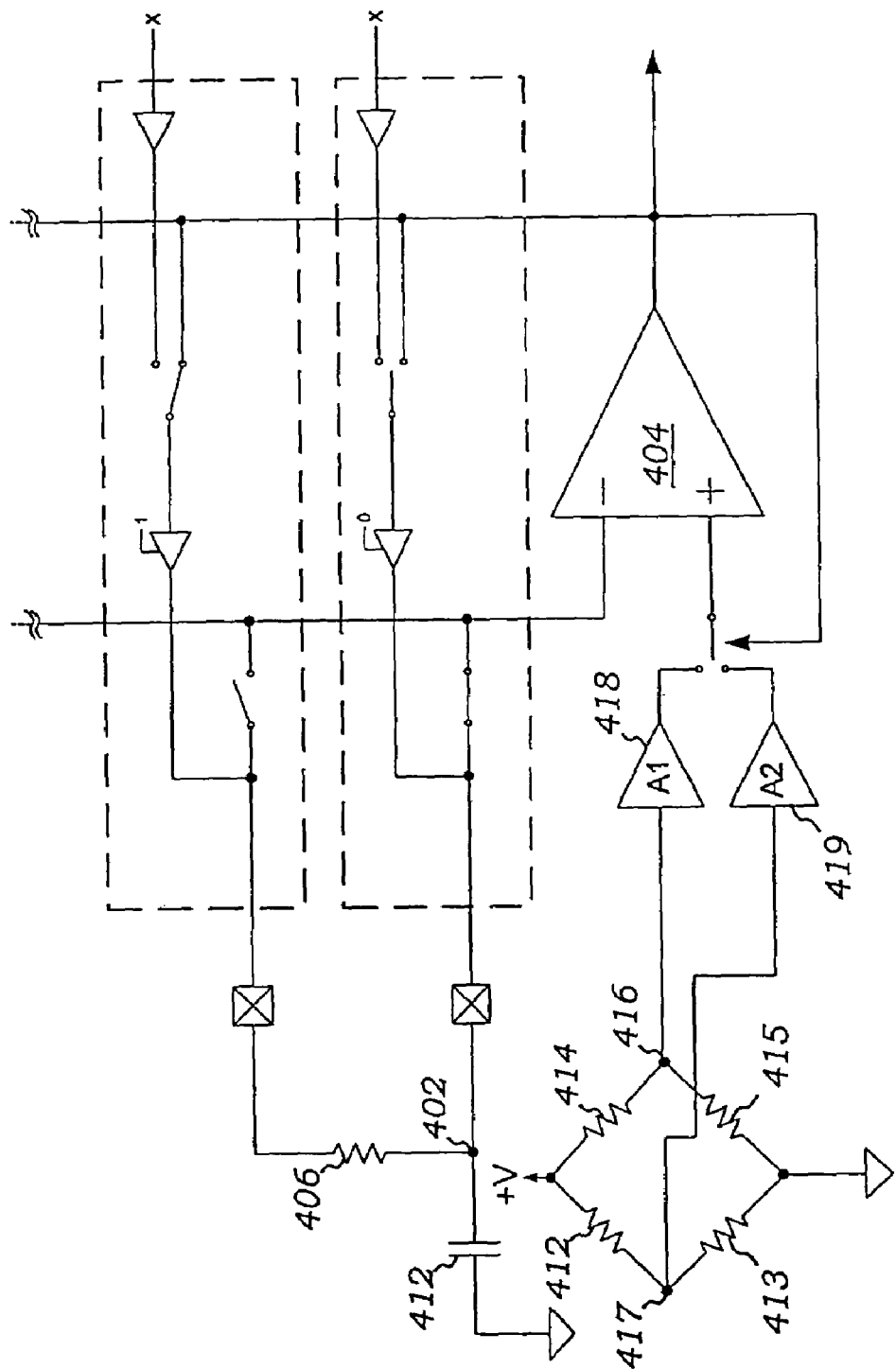

FIG. 15B shows an alternative method of configuring the device I/O channels to a sensor with a differential voltage scheme for altering the oscillator thresholds, which provides true time domain common mode rejection performance, especially with bridge-based sensors.

Figure 15C:
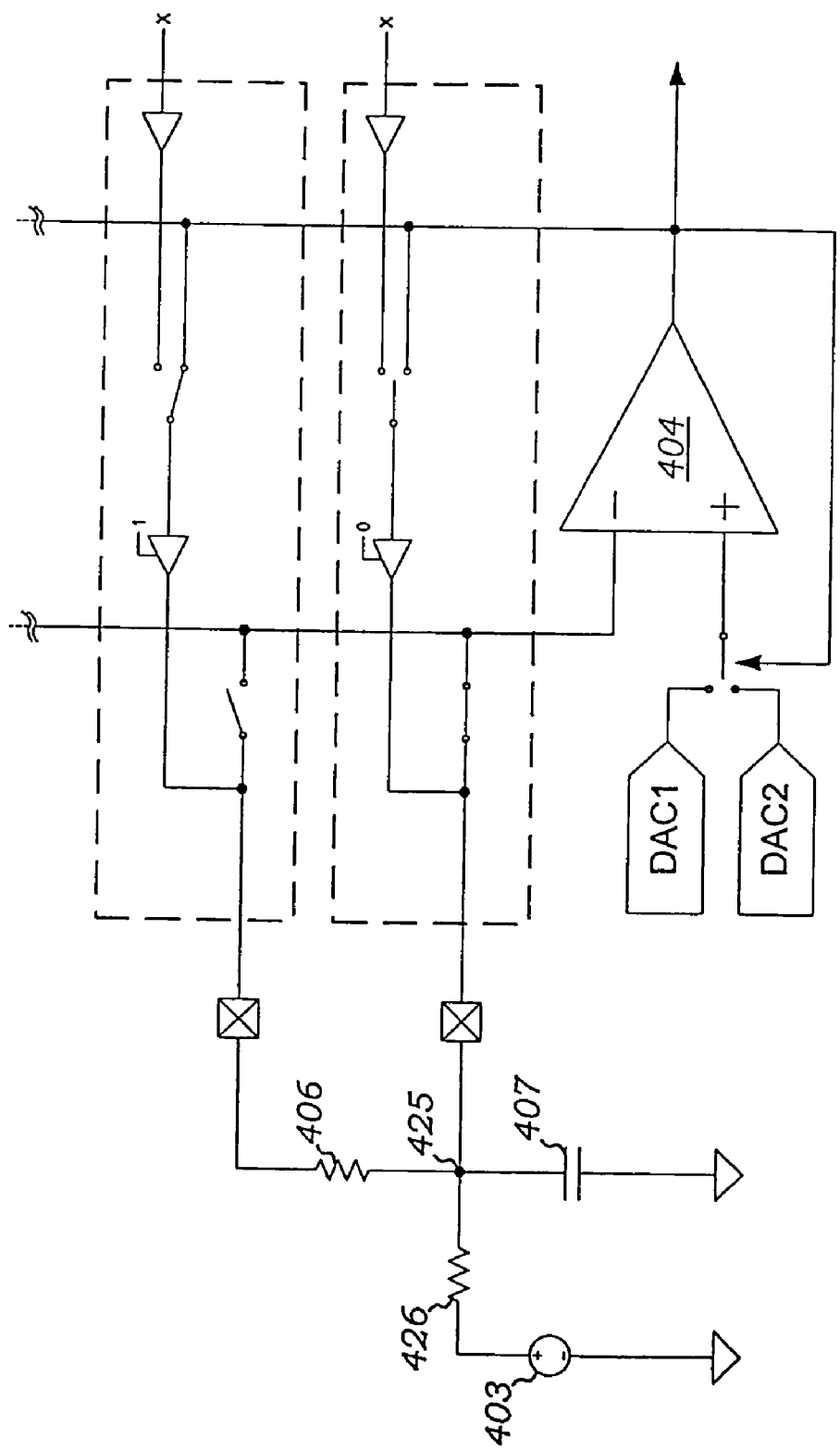

FIG. 15C shows an alternative method of configuring the device I/O channels to a sensor with voltage-based conversion technique by the biasing of a fixed RC oscillator.

Figure 15D:
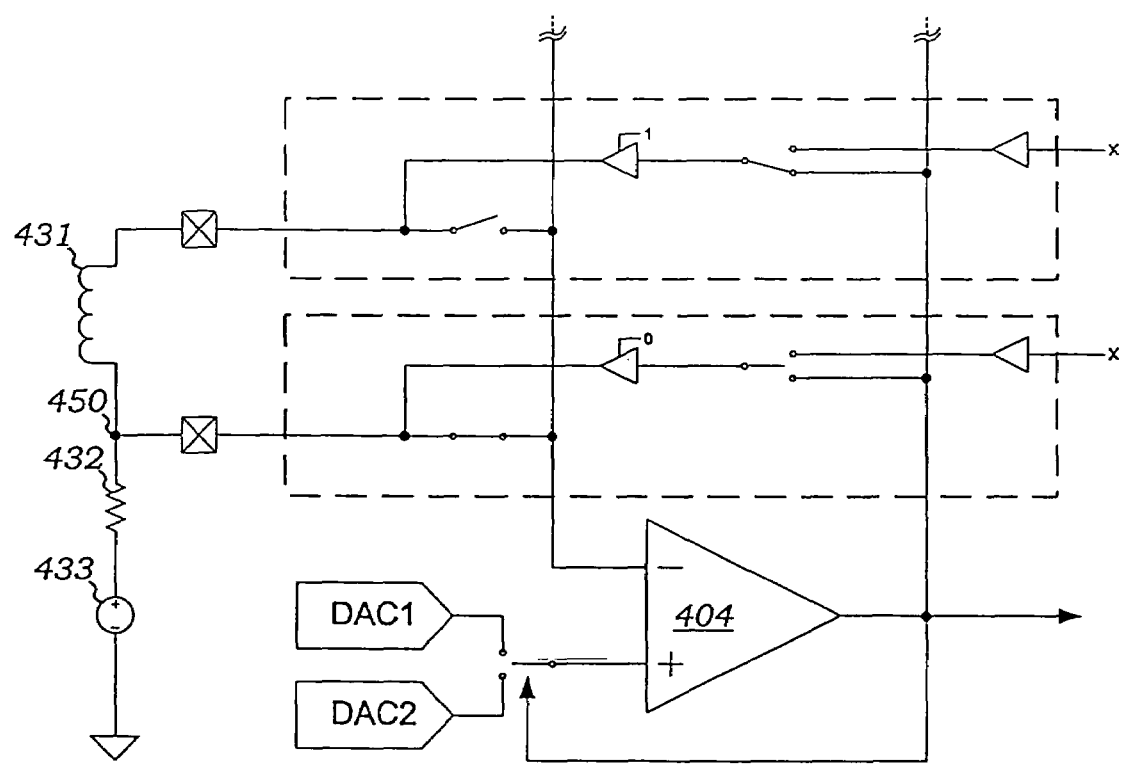

FIG. 15D shows an alternative method of configuring the device I/O channels to a sensor with a voltage-based conversion technique by the biasing of a fixed LR oscillator.

Figure 15E:
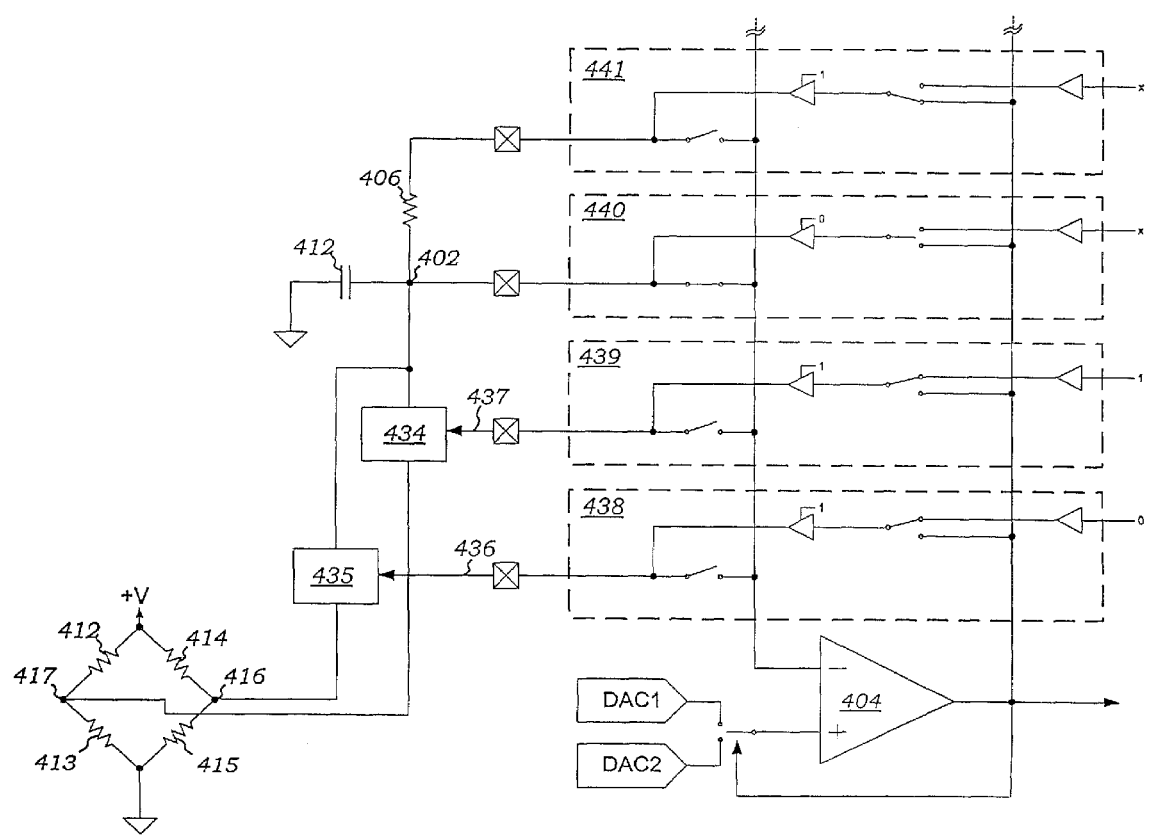

FIG. 15E shows an alternative method of configuring the device I/O channels to a sensor with a voltage-based conversion technique by the biasing of a fixed LR oscillator.

Figures 16A, 16B:
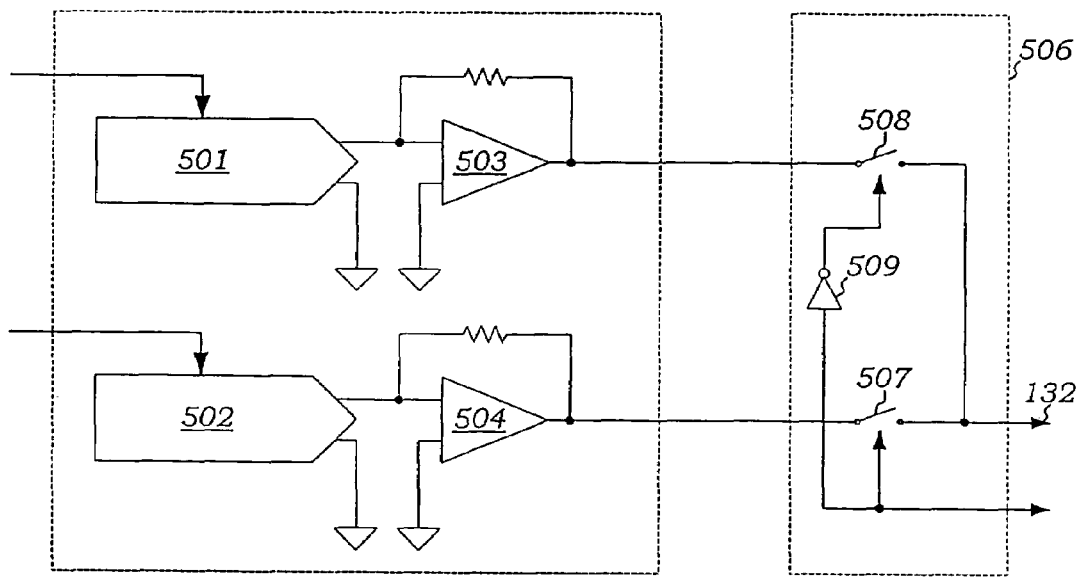

FIG. 16A illustrates a dual DAC circuit.
FIG. 16B illustrates a DAC selector circuit.

Figure 16C:
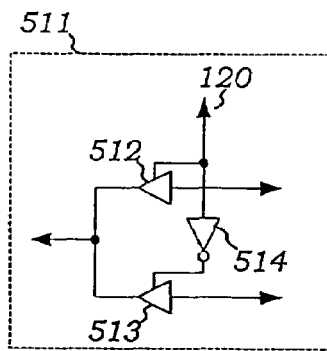

FIG. 16C illustrates a driver input selector circuit.

Figure 17A:
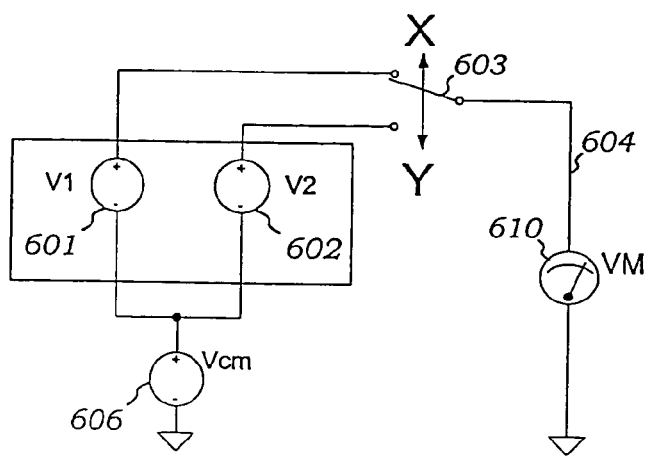

FIG. 17A is an illustration of the interleaved sampling method used.

Figure 17B:
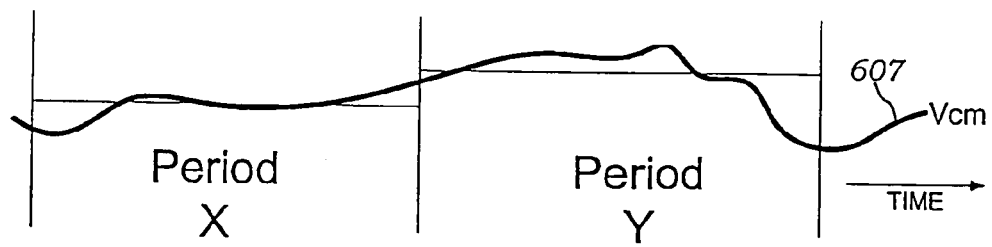

FIG. 17B is a waveform present at point 604 of FIG. 17A.

Figure 17C:
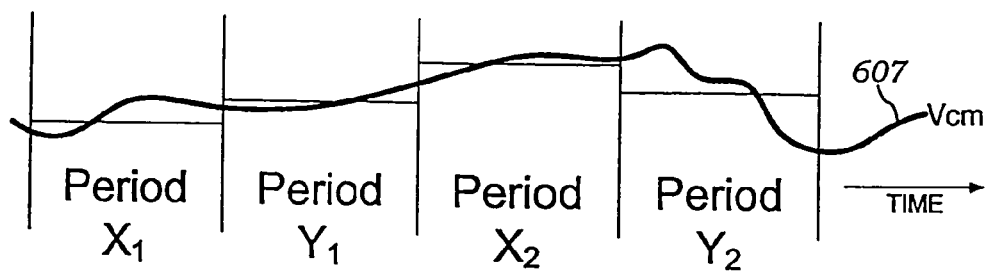

FIG. 17C is another waveform present at point 604 of FIG. 17A.

MODES FOR CARRYING OUT THE INVENTION

Figure 1A:
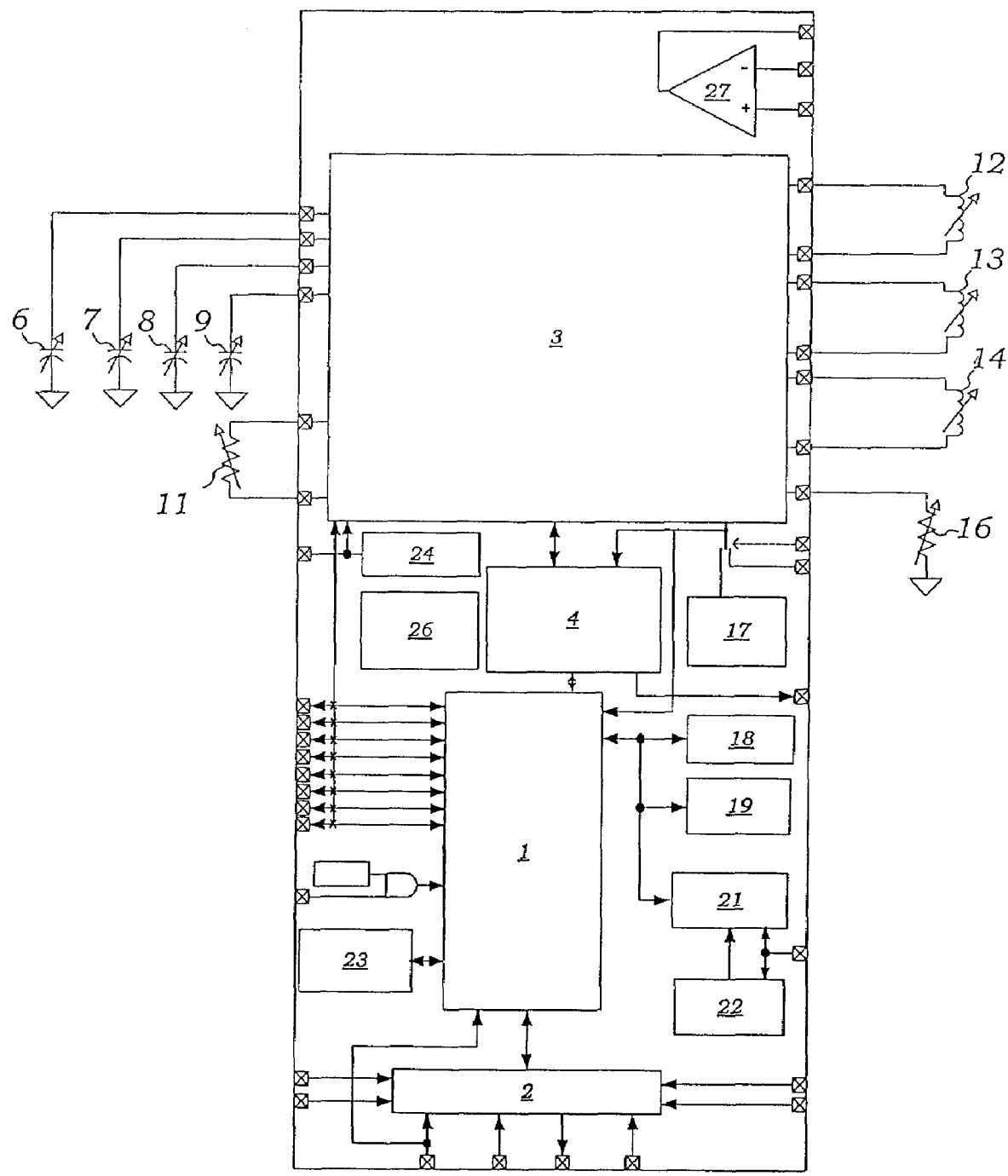
FIG. 1 is a block diagram of a first embodiment of a circuit in accordance with the present invention.
Figure 1B:
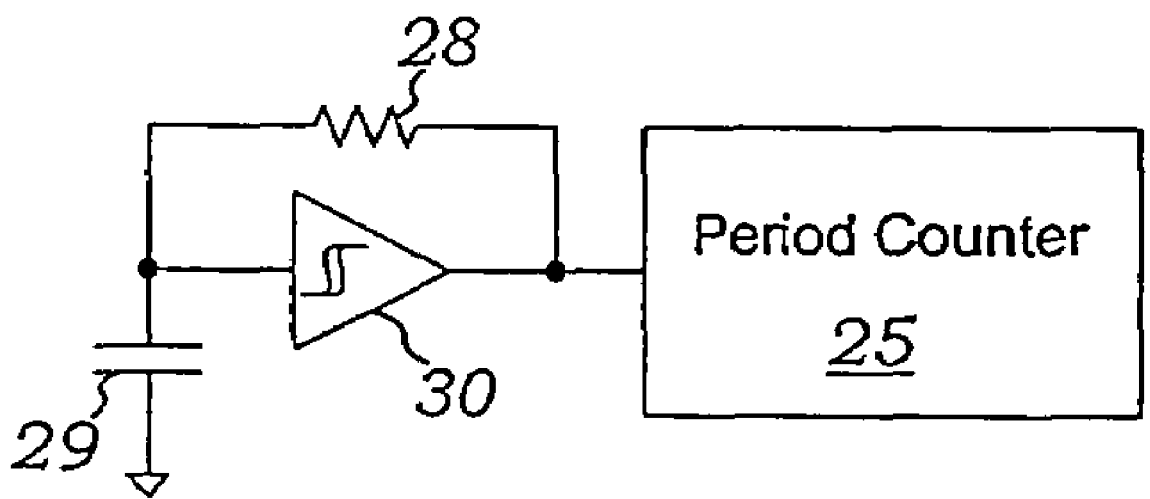

FIG. 1A is a block diagram of a first embodiment of the circuit in accordance with the present invention. A microprocessor performs most of the calculation functions of the device. A suitable microprocessor is a R80515 microprocessor but any suitable microprocessor could be substituted. An SPI and I2C (SPI/I2C) interface 2 is connected to microprocessor 1. SPI/I2C interface 2 provides suitable output signals in a variety of formats. An LR & RC Sensor Oscillator circuit 3, which is further detailed in FIG. 1B where the primary building block is a Schmitt trigger oscillator 30, is connected to microprocessor 1 by means of a Period Counter unit 4, 25. Four capacitive sensor units 6,7,8 and 9 and a resistive sensor 11 are shown connected to Oscillator 3 in this embodiment although it should be realized that the number of sensors necessary will vary with the application. Sensors 6, 7, 8, 9, and 11 are passive sensors connected in an RC oscillator configuration. Three inductive sensors 12, 13 and 14 and a resistive sensor 16 are shown connected to Sensor Oscillator circuit 3 in this embodiment although it should be realized that the number of sensors necessary will vary with the application. Sensors 12, 13, 14, and 16 are passive sensors connected in an LR oscillator configuration. A high-speed RC Oscillator 17 is connected to Sensor Oscillator circuit 3 and microprocessor 1 and serves as the high-speed system clock. RC oscillator 17 is used as the time-base for all the digital circuitry including microprocessor 1. RC oscillator 17 can be put into power down mode and an external signal can then wake it up. RC oscillator 17 can produce a frequency of from 8 to 18 MHz. The device is provided with a Random Access Memory 18 (RAM) connected to microprocessor 1 for storing information on a temporary basis. A 1024×8 SRAM unit is acceptable for RAM 18. The device is provided with a Read Only Memory 19 (ROM) connected to microprocessor 1 for storing operating firmware on a permanent basis. A 4096×8 ROM unit is acceptable for ROM 19. The device is provided with an Electrically Erasable Programmable Read Only Memory (EEPROM) connected to microprocessor 1 for storing information on a semi permanent basis. A 32×16 EEPROM is acceptable for EPROM 21. A Charge pump 22 is connected to EPROM 21 to control erasure and programming. A math coprocessor 23 is connected to microprocessor 1 to provide additional calculating capability for floating point calculations as well as particular 32 bit integer division and 16 bit integer multiplication, shift and normalize functions. An operational amplifier 27 is provided for buffering and amplification ability. It receives power from the power bus, has its own power control signal, and provides a minimum gain of 80 db.

Figure 2:
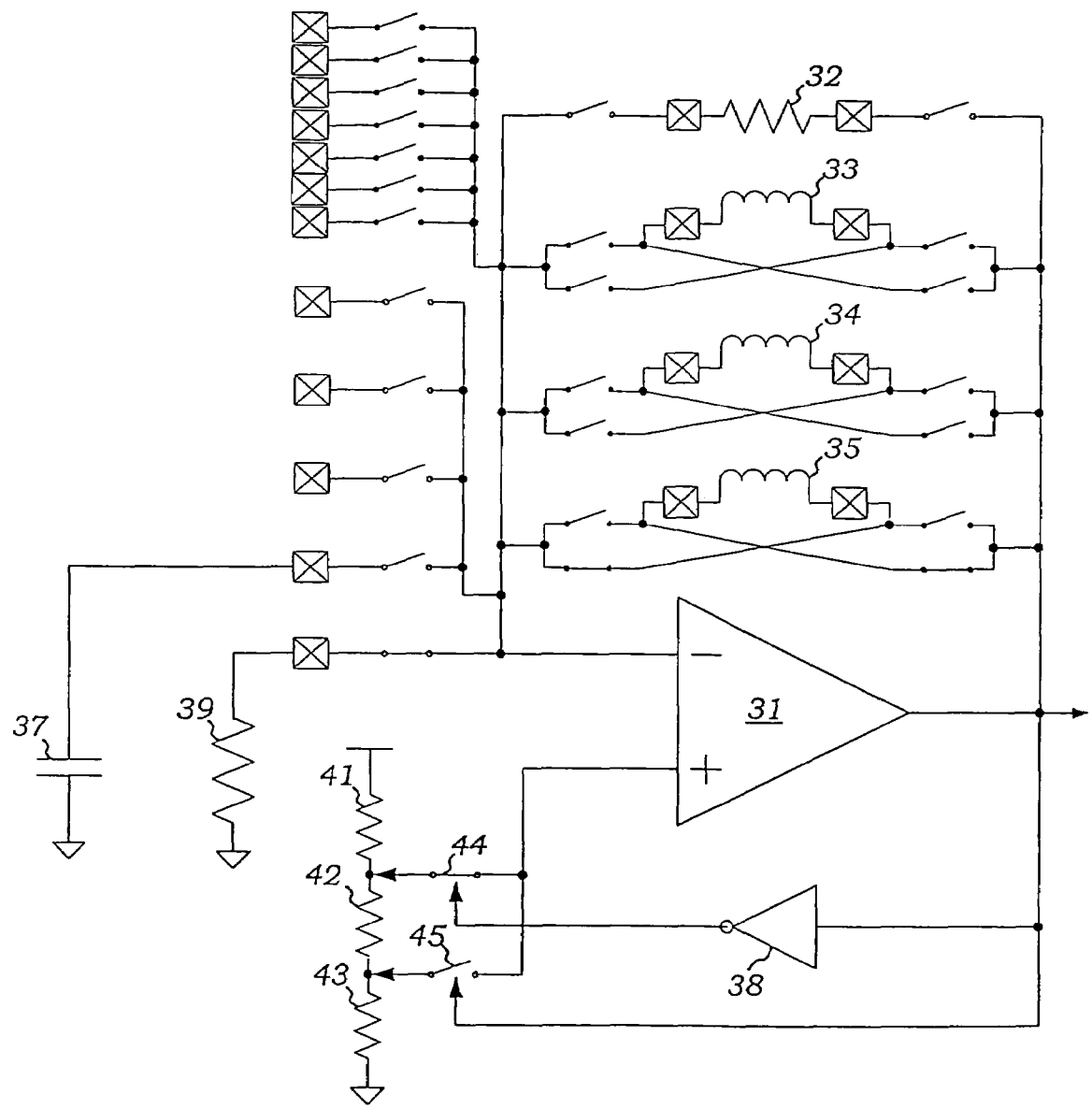
FIG. 2 is a block diagram of the Sensor Oscillator portion of the FIG. 1 embodiment, in accordance with the present invention.

FIG. 2 is a block diagram of Sensor Oscillator portion 3 of the FIG. 1 embodiment, in accordance with the present invention. Sensor Oscillator 3 includes a voltage comparator 31 connected and configured as a Schmitt Trigger Oscillator. A series of sensors 32, 33, 34 and 35 are connectable between the negative input and the output of amplifier 31 to provide a variable degree of negative feedback to enable oscillator frequency dependant upon sensor signal. While four inductors and one resistive sensor are shown, the number of such devices used is dependent upon the number needed. A voltage divider, which includes three resistors 41, 42 and 43, provides the trip voltages for voltage comparator 31. This voltage divider is preferably substituted with a digitally controllable digital to analog converter (DAC) and is referred to as a TripDAC for the purposes of the present invention. The voltage divider configuration is preferably adjusted to provide trip voltages of 0.77V at the point between resistor 42 and 43, and 1.5V at the junction between resistor 41 and 42, which are ⅔ and ⅓ of the supply voltage applied at the other end of resistor 41. Similarly, an upper TripDAC and a lower TripDAC can be configured to provide analogous switching thresholds, and is preferable in that the switching thresholds can be dynamically adjusted in situ during sensor operation in order to tune and optimize the performance of the sensor element attached to this circuit. An inverter 38 provides a 180_phase inverted signal to activate a switch 44 opposite of another switch 45 which is the logic necessary to correctly select between the application of the upper TripDAC or the lower TripDAC output voltages to the positive input of the voltage comparator to enable oscillation of the Schmitt trigger. The illustrated embodiment is capable of operating in both RC and LR modes. If the feedback sensor is resistive 32, a fixed capacitive component 37 is connected between the negative input of the voltage comparator 31 and ground. This is the RC Sensor Oscillator configuration. It should be obvious to one skilled in the art that this RC topology is capable of being used with either a resistive based sensor as well as a capacitive based sensor, where the complimentary timing impedance is chosen to be of fixed value. The same approach can be easily applied to an LR oscillator configuration as well. The RC Sensor Oscillator configuration is used to measure changes in resistance, capacitance, and even voltage. Capacitor 37 changes capacitance as the module receives measurement stimulus, which changes the frequency of RC Sensor Oscillator 3. The output period for this circuit using trip voltages of 0.77 V and 1.5 V is t=1.386*RC. If the feedback sensor is inductive, such as inductor 33, a resistive sensor 39 is connected between the negative input of amplifier 31 and ground. This is the LR Sensor Oscillator configuration. The LR Sensor Oscillator is used to measure changes in resistance, inductance, and even voltage. Inductor 33 changes inductance as the module receives measurement stimulus, which changes the frequency of LR Sensor Oscillator 3. The output period for this circuit using trip voltages of 0.77 V and 1.5 V is t=1.386*L/R. An example of this use is for magnetic inductive sensors as described in U.S. Pat. No. 4,851,775. Inductors 33, 34 and 35 are oriented in the x, y and z axes respectfully and can be biased in opposing directions during the two period counting measurements in order to compensate for temperature drift as described in U.S. Pat. No. 5,239,264. This helps null out magnetic noise and eliminates zero drift over temperature, and as such, is equivalent to a fully differential measurement in the voltage domain.

Figure 3:
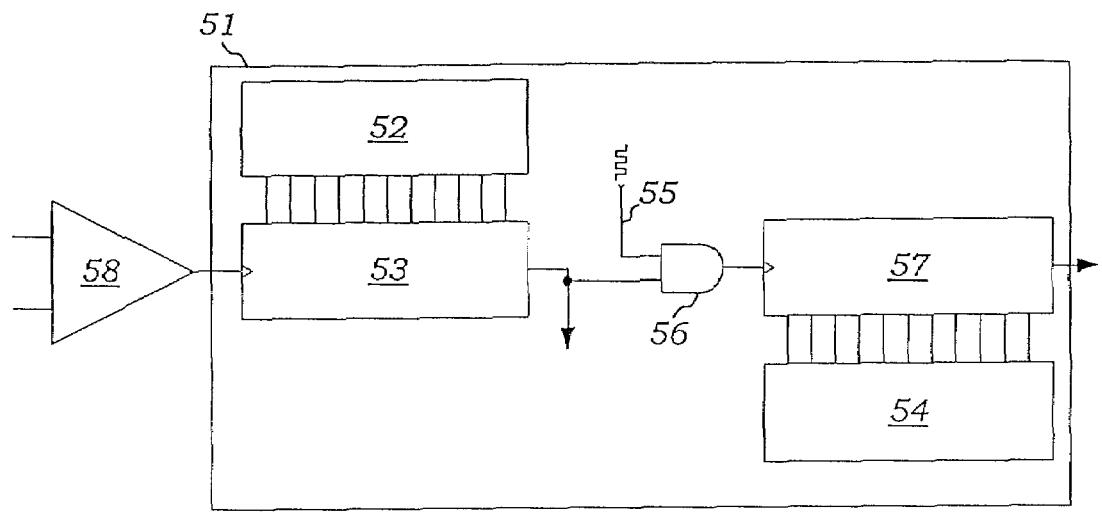
FIG. 3 is a block diagram of the Period Counter portion of the FIG. 1 embodiment, in accordance with the present invention.

FIG. 3 is a block diagram of the Period Counter portion of the FIG. 1 embodiment, in accordance with the present invention. The Period Counter unit 51 is driven with a high speed system clock 55 and is configured to measure the period of the signal output from the voltage comparator 31, which is an asynchronous signal to said high speed system clock. Logic is provided to measure the Sensor Oscillator 58 signal's period and can be configured to measure from any start clock edge to any stop clock edge or from directly from a selected state, high or low, to the next selected high or low state. The Sensor Oscillator signal is used to gate a counter which counts the number of high speed system clock pulses during the selected gating interval. The resultant count value from the high speed system clock counter is directly proportional to the period, and inversely proportional to the frequency of the Sensor Oscillator signal. As can be seen, the most accurate and highest resolution results will be obtained when the high speed system clock frequency is much greater than the Sensor Oscillator signal frequency. As can also be seen, the resolution of such a Period Counter unit 51 can be determined by selecting the number of Sensor Oscillator signal pulse cycles to gate the high speed system counter clock. A greater gating value will result in greater resolution at the sacrifice of sample duration, while a lower gating value will result in less resolution but will reduce sample duration. Such a gating value (pre-scaler) can be determined by providing a state-machine based Pre-Load register 52, into which the gating value can be loaded by the system user, whether that is an external microcontroller host, a dedicated internal or external state machine, or an integrated microcontroller. Such a system can also be set to measure pulse width if the pre-scaler value is set to gate only one half of one Sensor Oscillator signal pulse. In this case, the it is advantageous for the high speed system clock to be a far higher value than the frequency of the Sensor Oscillator signal in order to gain adequate measurement resolution. In the preferred embodiment, in order to measure pulse width, the Period Select register 52 can be loaded with a control byte value of zero. The polarity of the pulse to be measured can also be selected by setting a separate polarity control bit in a polarity control register. In order to measure period, the Period Select register 52 is loaded with a non-zero number. When started, Period Counter unit 51 will load the Cycle Counter 53, which is a 16-bit down-counter, with the value from Pre-Load register 52. At this moment, the Results register 54 will also be cleared. The Clock Gate 56 will enable the 16-bit high-speed clock counter 57 upon the next edge of Sensor Comparator output 58. At this same time, Cycle counter 53 will begin to count down the specified number of cycles of the Sensor Comparator output 58, as determined by the value of the Pre-Scaler in the Pre-Load register 52. Simultaneously, the 16-bit High-Speed counter 57 will count high-speed system clock cycles 55. When Cycle counter 53 underflows Clock gate 56 will disable the 16-bit high-speed clock counter 57 from counting and a completion flag will be set in a separate control register in order to indicate that a sample cycle has been completed. The 16-bit high-speed clock counter 57 also has an overflow output that is connected to a maskable interrupt, which can enable a system controller to accumulate carry bits to be stored in an arbitrary number of value registers, thus increasing the dynamic range of the counter beyond 16-bits.

Figure 4:
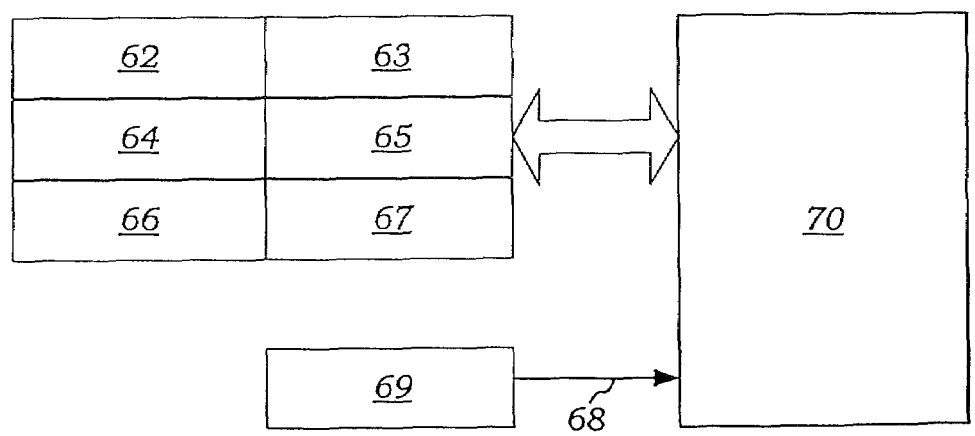
FIG. 4 is a block diagram of the Cordic Math Engine portion of the FIG. 1 embodiment, in accordance with the present invention.

FIG. 4 is a block diagram of the Cordic Math Engine 61 portion of the FIG. 1 embodiment, in accordance with the present invention. The Cordic Math Engine 61 is used to perform trigonometric and other transcendental calculations related to sensor data processing. This block has the advantage of reducing code space and time required for the microprocessor to make any necessary mathematical calculations. This block will also reduce the amount of SRAM needed to store values during mathematical operations, such as a heading calculation. In Brief, the X register pairs 62 and 63, Y register pairs 64 and 65 and Z register pairs 66 and 67 are loaded with values and constants. The MODE register 69 is set to the appropriate mode for the type of calculation to perform by writing the appropriate command byte corresponding to the mathematical function to be performed on the values pre-loaded into the X, Y and Z register pairs 64, 65, 66, 67, 68 and 69. As would be obvious to one skilled in the art, the types of number which can be operated on do not have to be limited to integer values, nor do they have to be limited to 16-bit values. As would also be obvious to one skilled in the art, the Cordic Math Engine 61 can be expanded to include an arbitrary number and variety of different mathematical or logic functions. In the preferred embodiment, the Cordic Math Engine 61 is initiated to commence calculations by the setting of a control and status bit 68 to logic high. The Cordic Math Engine 61 state machine will reset this bit when the calculation is complete. At this time the result(s) are available in the X register pairs 62 and 63, Y register pairs 64 and 65 and Z register pairs 66 and 67. The unit described in the preferred embodiment is capable of supporting cosine, sine, tangent, magnitude, arctangent, arcsine, arccosine, addition, multiplication, division, natural logarithm, hyperbolic cosine, hyperbolic sine, hyperbolic tangent, hyperbolic arctangent, exponent and square root functions.

Figure 5A:
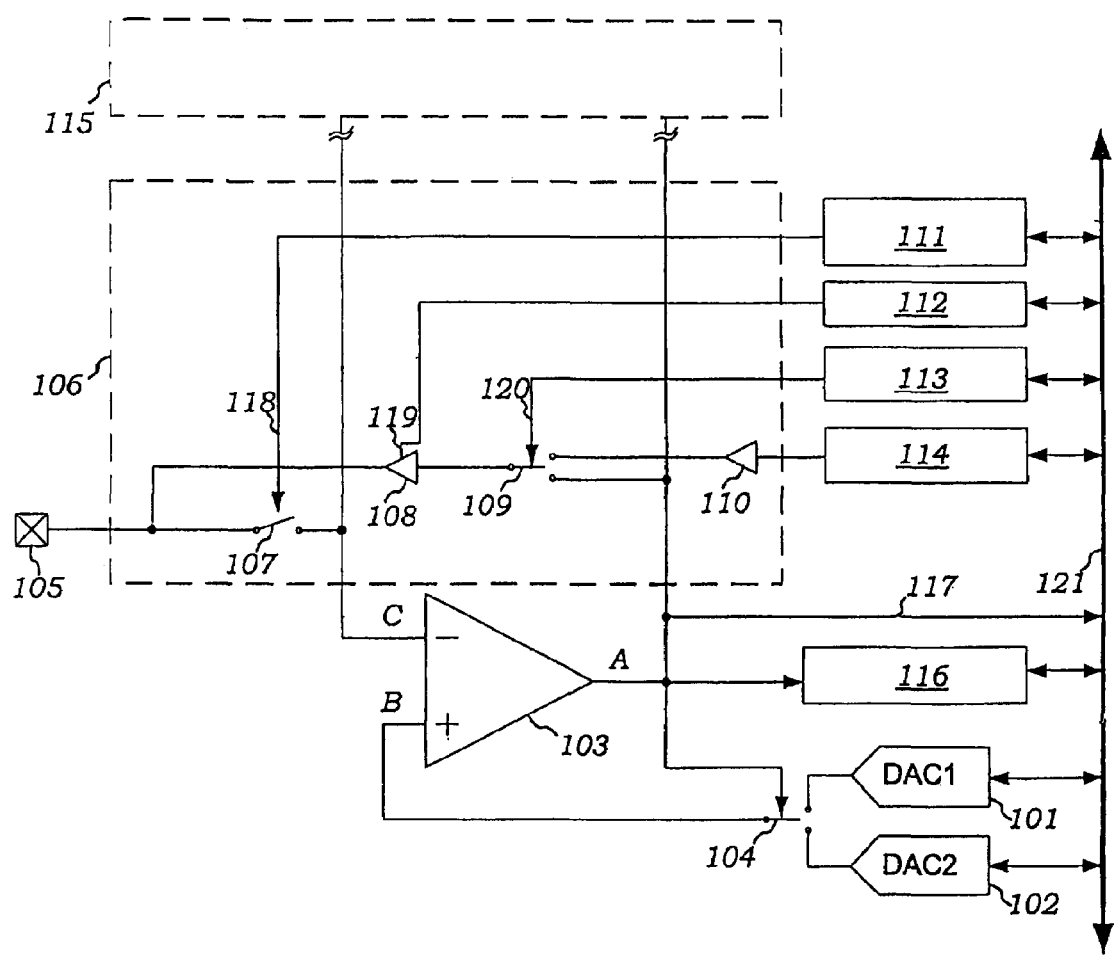
FIG. 5A is a schematic diagram of a basic oscillator with one flexible Universal Sensor Input/Output channel (Universal Sensor I/O) shown according to the embodiment illustrated in FIG. 1.

FIG. 5A is a schematic diagram of a basic sensor oscillator with one flexible Universal Sensor Input and Output channel (Universal Sensor I/O) shown. This diagram depicts the core building block circuit that can measure a sensor's electrical properties such as resistance, capacitance, inductance and voltage. It can also measure a sensor's pulse width if it has a pulse mode output. The circuit is based on a comparator with positive feedback so that it oscillates when the desired sensor to be measured is connected to it through two Universal Sensor I/O channels along with its corresponding complimentary oscillator impedance. The oscillation frequency is dependant on the electrical properties of the components and circuits connected to the device I/O pin 105 as well as the output voltages of the two Digital to Analog Converters (DAC) 101 and 102. FIG. 5A shows a single Universal Sensor I/O channel 106. Additional Universal Sensor I/O channels 115 can be cascaded as shown. Only one channel is required for pulse measurements and at least two channels are required to measure a sensor's electrical properties. As can be seen from the Universal Sensor I/O channel 106 driver, switch and circuit topology, such a channel can also be applied to standard voltage or current based sensors where the excitation front-end and the conversion back-end can be those of traditional excitation and Analog to Digital Conversion techniques. As can also be seen, this same Universal Sensor I/O channel 106 can also be controlled and used as a General Purpose Input and Output (GPIO) channel for use with both digital and analog data signals, much as those implemented on many commercially available microprocessors currently available on the market today. To use the Universal Sensor I/O channel 106 as a GPIO to carry digital data out, configuration register 112 would enable driver 108 through 119, while configuration register 113 would cause switch 109 through switch control 120 to be set to receive data from configuration register 114 through buffer 110. Configuration register 114 would receive the data to be sent out through output node 105 from the data bus 121. To use the Universal Sensor I/O channel 106 as a digital data input GPIO channel configuration register 111 would cause switch 107 to be closed through switch control 118, then DAC1 and DAC2 101, 102 can be set to a TTL logic compatible switching threshold such that whatever input signal appears at negative input C of comparator 103 from input node 105 could appear at output A of Comparator 103 and would be carried to the data bus 121 by connection 117. Comparator 103 could be a TLC3702. The buffer 110 could be a 74HC4050. The analog switch 107 could be a DG442. The registers 111-114, and 116, hold the configuration data to drive the appropriate circuitry, is transmitted from the Data Communications Bus 121 which could be of the type 74AC373. The Data Communications bus could be a variable bit width bus, although it would typically be 8 to 16 bits wide. This data bus can be controlled by a microprocessor or an application specific logical state machine.

In addition to the tremendous flexibility of the frequency-based approach, the novelty of the circuit of this present invention is the flexibility and universality of the configurability of each individual Universal Sensor I/O channel to suit a wide variety of sensor element types and sensor array topologies. The device I/O pin 105 can be configured as a sense input for the comparator 103 (Sense Input Mode), a comparator output (Oscillator Output Mode), a driven output fixed voltage (Output Low Mode or Output High Mode) or it can be configured to be high impedance (High Z Mode). The configuration registers 111, 112, 113 and 114 are used to configure the Universal Sensor I/O channel. Each such channel is controlled independently but in the same manner. A Data Communications Bus 121 allows access to the control registers and the period measurement circuitry from an external and/or internal controller.

Sense Input Mode is a channel configuration where the device I/O pin 105 is connected to the sense input of the comparator 103, which is the negative input of the comparator 103. To set this mode the Input Select Switch Control Register 111 opens or closes the input select switch 107 through the selector switches control signal 118. This selector switch is typically an analog switch made from transistors. The output driver 108 is disabled through its control input 119 by the Driver Enable Register 112, which sets the output of the driver to a high impedance state. Since the driver 108 is disabled, the state of the Driver Source Selector Switch 109 and the Output Port Driver 110 do not matter.

Oscillator Output Mode is a channel configuration register where the device I/O pin 105 is connected to the output of the comparator 103. To set this mode, the Input Selector Switch 107 is opened, the output driver 108 is enabled and the Driver Source Select Switch 109 is set to connect the comparator 103 output to the driver input through the Selector Switch Control Signal 120 by the Driver Source Select Register 113. Output Low Mode or Output High Mode are channel configurations where the device I/O pin 105 is driven to either circuit common ground (logic level 0), or to the circuit's supply voltage (logic level 1). To set this mode, the Input Selector Switch 107 is opened, the output driver 108 is enabled and the Driver Source Select Switch 109 is controlled to connect the Output Port 110 to the driver 108 input. The state of the Output Port register 114 now controls the output level of the device I/O pin 105. This configuration is typically used in conjunction with the High Z Mode to multiplex an array of sensors to a single or multiple inputs by selectively grounding (Output Low Mode) or electrically floating (High Z Mode) each sensor individually. High Z Mode is a channel configuration where the device I/O pin is not electrically connected to anything internally and appears to an external connection as an electrical high impedance node. In this mode the Input Select Switch 107 is turned off or opened, and the output driver 108 is disabled.

Figure 5B:
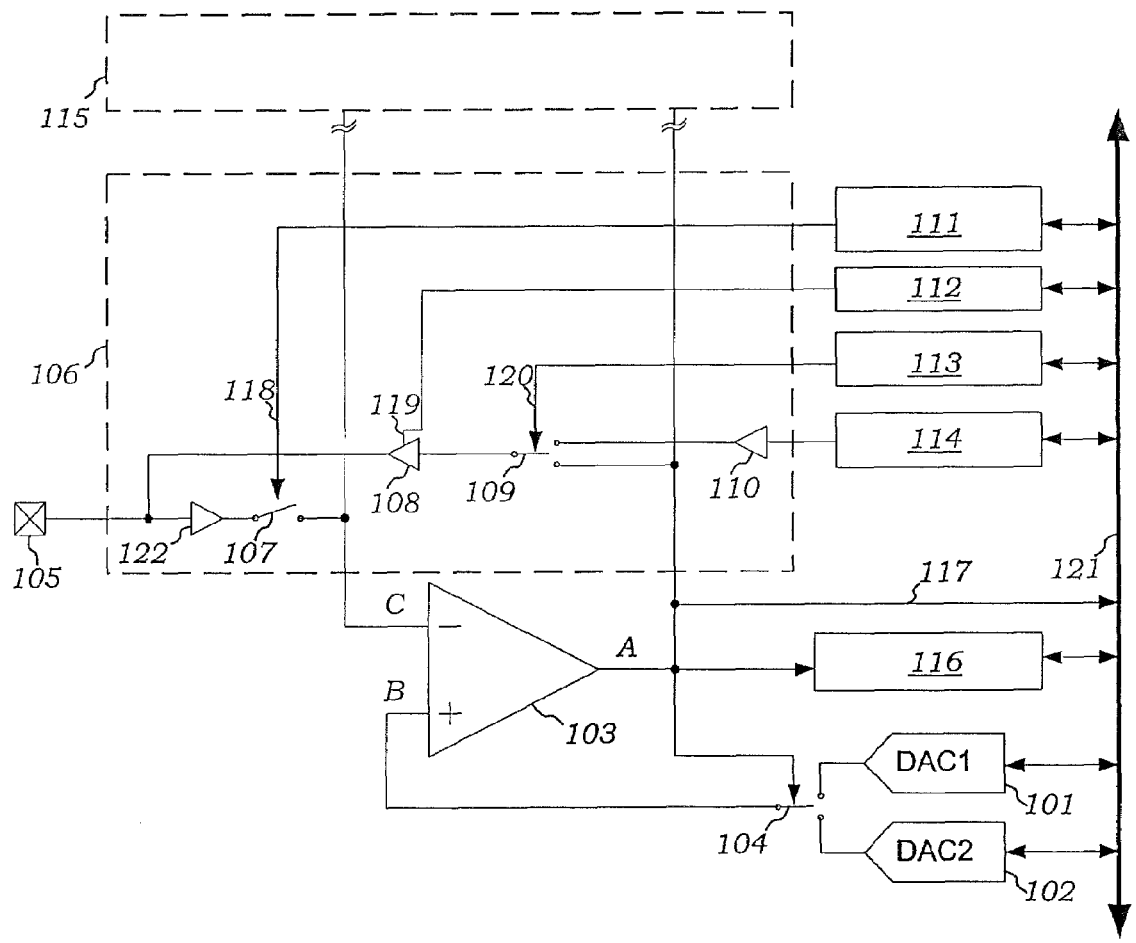
FIG. 5B is a partial diagram of the FIG. 1 embodiment.

FIG. 5B illustrates a further novel variation on the Universal Sensor I/O channel 106 as illustrated in FIG. 5A. A buffer and gain stage 122 is introduced to serve two novel purposes. The first purpose is that when additional Universal Sensor I/O channels 115 are added in a cascaded manner a great deal of additional parasitic input capacitance is introduced to every other Universal Sensor I/O channel in the system. This additional parasitic capacitance can often overwhelm the actual desired sensor signal, especially where MEMS based sensors are involved, since MEMS sensors involve microscopic silicon based structures, whose native electrical impedance values are extremely small to begin with. The buffer and gain stage 122 helps to capacitively isolate each Universal Sensor I/O channel from all the other channels in the system, which greatly improves small signal operation. The second purpose is that certain sensors display piezo characteristics and so, if allowed to make full electrical excursions when used in an oscillator circuit, as contemplated by the present invention, additional mechanical stress induced electrical noise is generated which degrades signal to noise performance. With the buffer and gain stage 122 adjusted to provide greater than unity gain, the mechanical deflections experienced by the sensor in order to traverse from the upper switching threshold to the lower is greatly decreased as the gain allows for a voltage boost out of the sensor without necessitating that the sensor be subjected to the larger voltage. This greatly improves signal to noise performance of such sensors as well.

Figure 6:
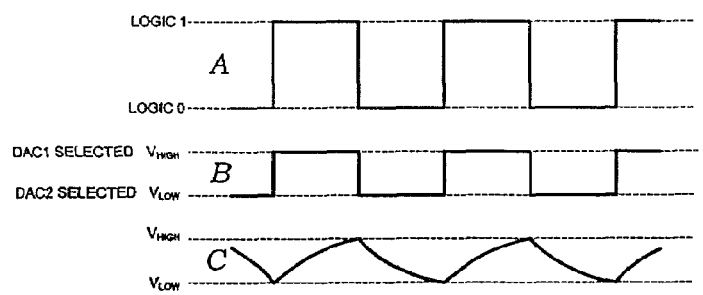
FIG. 6 is an illustration of the typical waveforms observed when the circuit of FIG. 5 is connected with external sensor elements.

FIG. 6 is an illustration of the typical waveforms observed when the circuit is connected with external sensor elements and support components to form an oscillator. The principal is that the signal (C) created by the external component network, which includes the sensor as the variable timing element, lags the oscillator output signal (B). This lag varies with the change in the sensor element's electrical properties to create a frequency varying square-wave signal at the output of the comparator 103.

Figure 7:
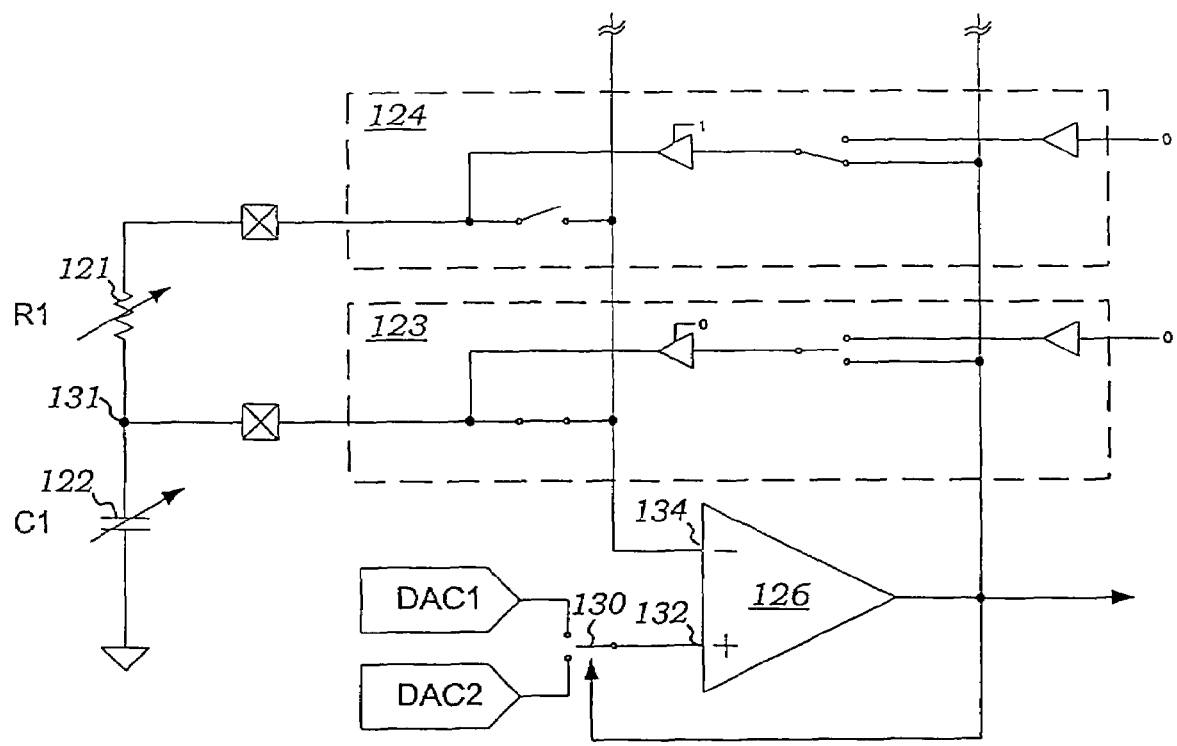
FIG. 7 shows the most basic oscillator configuration using an RC network.

FIG. 7 shows the most basic oscillator configuration. Resistance 121 and capacitance 122 create the lag network for this circuit. Although both resistance 121 and capacitance 122 are shown in the figure to be of variable values, normally only one of the two would be of variable nature (the sensor element) while the other impedance would be of fixed value to form the oscillator's matching timing control elements. Either or both components, however, can be the sensing elements because as either components' value changes so does the output frequency of the oscillator. But as mentioned, in most cases, one of the two impedances is fixed while the other is the variable impedance sensor element.

The relationship of component value to period of oscillation is:

Period=kR1C1

Where $k=LN((1(V\_HIGH-V\_LOW)/(Vsupply-V\_LOW))*(1(V\_HIGH-V\_LOW)/V\_HIGH))$

V_HIGH=DAC1_voltage, V_LOW=DAC2_voltage

The first device I/O Channel 123 is configured in the Sense Input Mode and the second device I/O Channel 124 is configured in the Oscillator Output Mode. If we assume the output of the comparator 126, and hence the output of the oscillator circuit, has just switched from a low state (0 Volts out) to a high state (Vsupply Volts out) the voltage across capacitance 122 at point 131 will rise at a slower rate, as determined by its value and that of the resistance 121. At the same time, the voltage at the input of the positive terminal of the comparator 126 changes from V_LOW to V_HIGH as determined by the DAC selector switch 130. Because the first channel 123 is configured in the Sense Input Mode, the 121, 122 signals at point 131 is connected to the negative input of the comparator 134. When the voltage at negative terminal of the comparator exceeds the positive terminal's voltage, the output of the comparator switches from high to low, The DAC selector switch now selects DAC2 and the voltage at the negative terminal is now V_LOW and the voltage at point 131 begins to drop until it reaches the new threshold at which point the state of the comparator switches polarity at its output again and the process repeats itself, thus setting up the astable oscillator.

Figure 8:
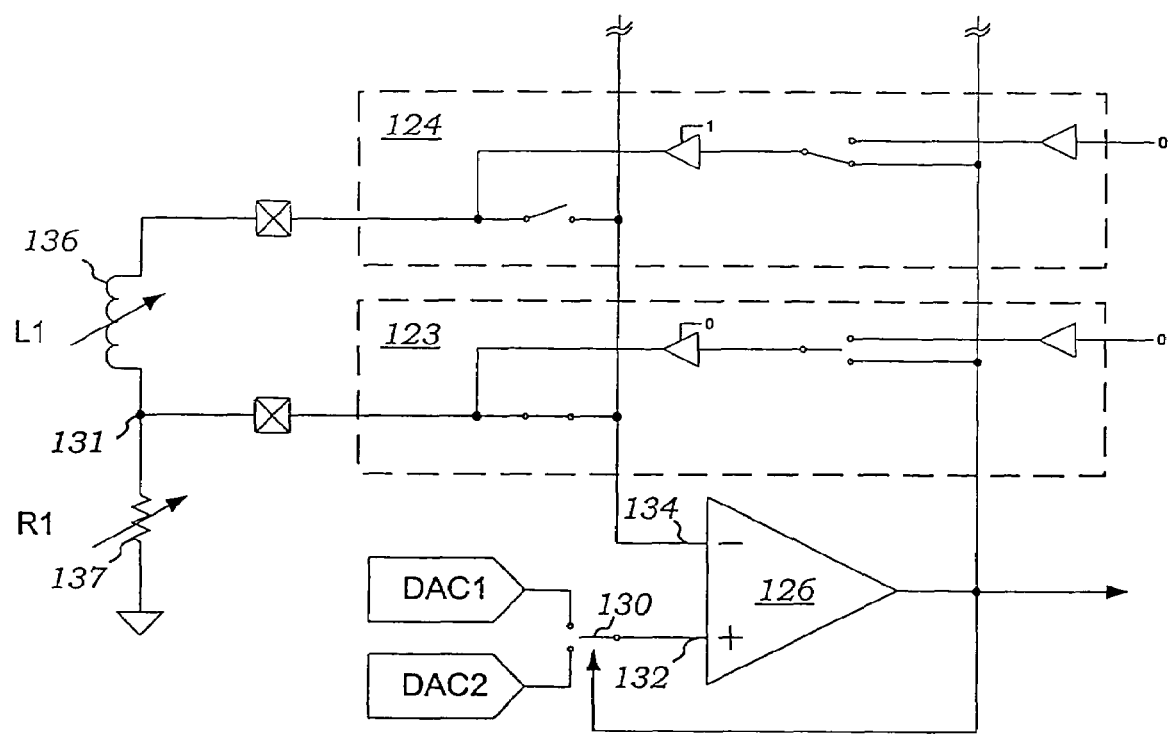
FIG. 8 shows the most basic oscillator configuration using an LR network.

FIG. 8 shows the most basic oscillator configuration using an LR network topology. This configuration is similar to that illustrated in FIG. 7 and identical numbers are shown for identical parts except that the lag network consists of an LR network including an inductance 136 and a resistance 137. The relationship to period of the output signal is: Period=kL1/R1 The first device I/O Channel 123 is configured in the Sense Input Mode and the second device I/O Channel 124 is configured in the Oscillator Output Mode. If we assume the output of the comparator 126, and hence the output of the oscillator circuit has just switched from a low state (0 Volts out) to a high state (Vsupply Volts out) the voltage across resistance 136 at point 131 will rise at a slower rate as determined by its value and that of inductance 136. At the same time the voltage at the input of the positive terminal of the comparator 126 changes from V_LOW to V_HIGH as determined by the DAC selector switch 130. Because the first channel 123 is configured in the Sense Input Mode the 136, 137 signals at point 131 is connected to the negative input of the comparator 134. When the voltage at the negative input terminal of the comparator exceeds the positive terminal's voltage, the output of the comparator switches from high to low at which point, the DAC selector switch then selects DAC2. The voltage at the negative terminal is now V_LOW and the voltage at point 131 begins drop until it reaches the new threshold and the state of the comparator switches again and the process repeats itself, thus setting up the astable oscillator.

Figure 9:
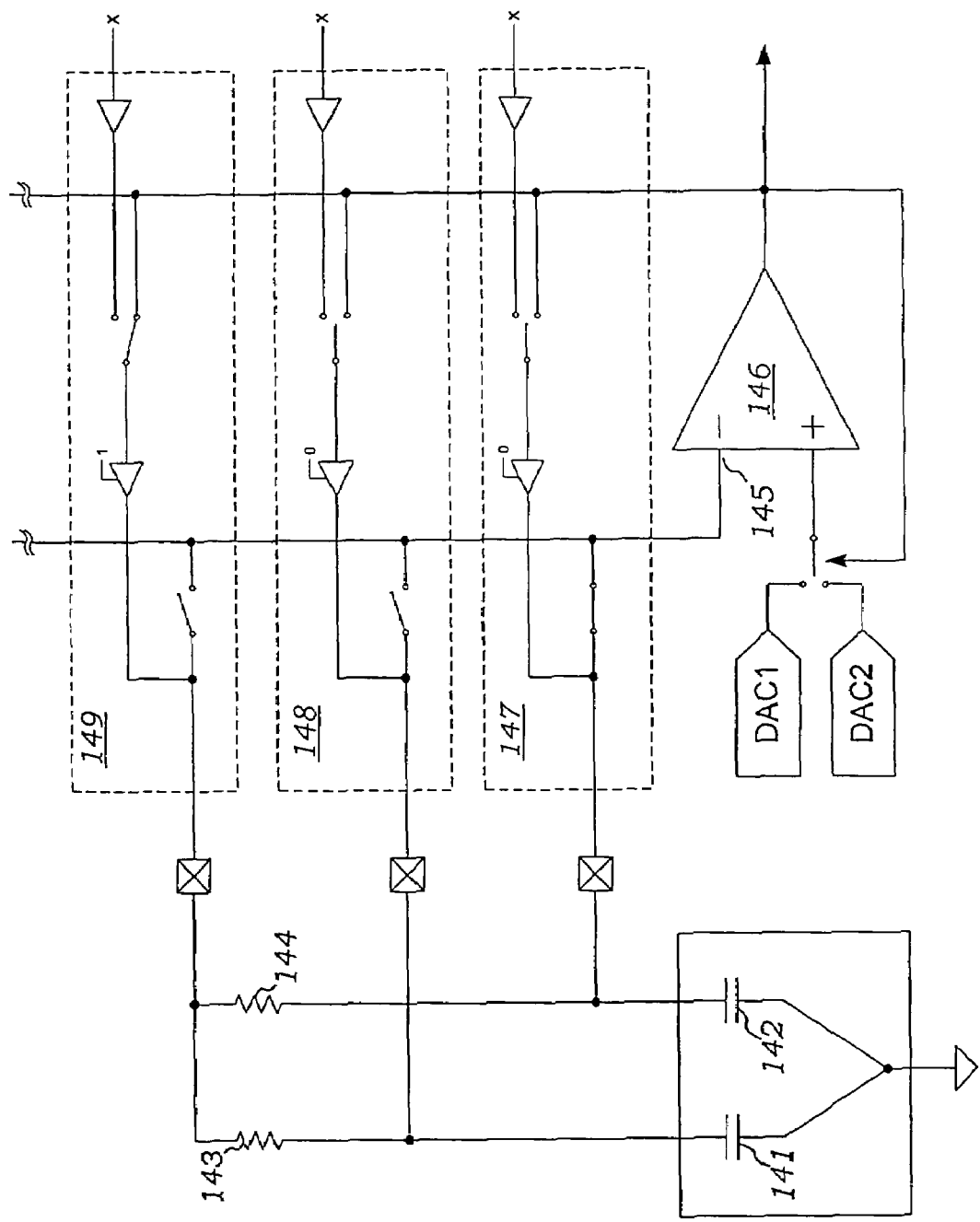
FIG. 9 shows a method of configuring the device I/O channels to a sensor with multiple capacitive sensor elements.

FIG. 9 shows a further method of configuring the device I/O channels to a sensor with multiple capacitive sensor elements 141 and 142. This method is similar to the basic RC configuration shown in FIG. 7 except that an extra channel 149 is used to read a second RC lag network 142 and 144 into the comparator's 146 negative input 145. The two RC networks 141, 143 and 142, 144 share a 3$^{rd}$ common Device I/O channel 149, which is configured in the Oscillator Output Mode. The 1$^{st}$ Device I/O channel 147 and the 2$^{nd}$ Device I/O channel 148 are alternately configured as Sense Input Mode and High Z mode. To engage the 143 and 141 networks in an oscillator circuit the 2$^{nd}$ Device I/O channel 148 is set to Sense Input Mode and the 1$^{st}$ Device I/O channel 147 is set to High Z mode. Likewise to engage 142 and 144 into an oscillator circuit the 1$^{st}$ Device I/O channel 147 is set to Sense Input Mode and the 2$^{nd}$ Device I/O channel 148 is set to High Z mode. This way, the independent values of 141 and 142 can be measured separately. FIG. 9 shows 142 and 144 RC Network as the one configured into this oscillator circuit.

Figure 10:
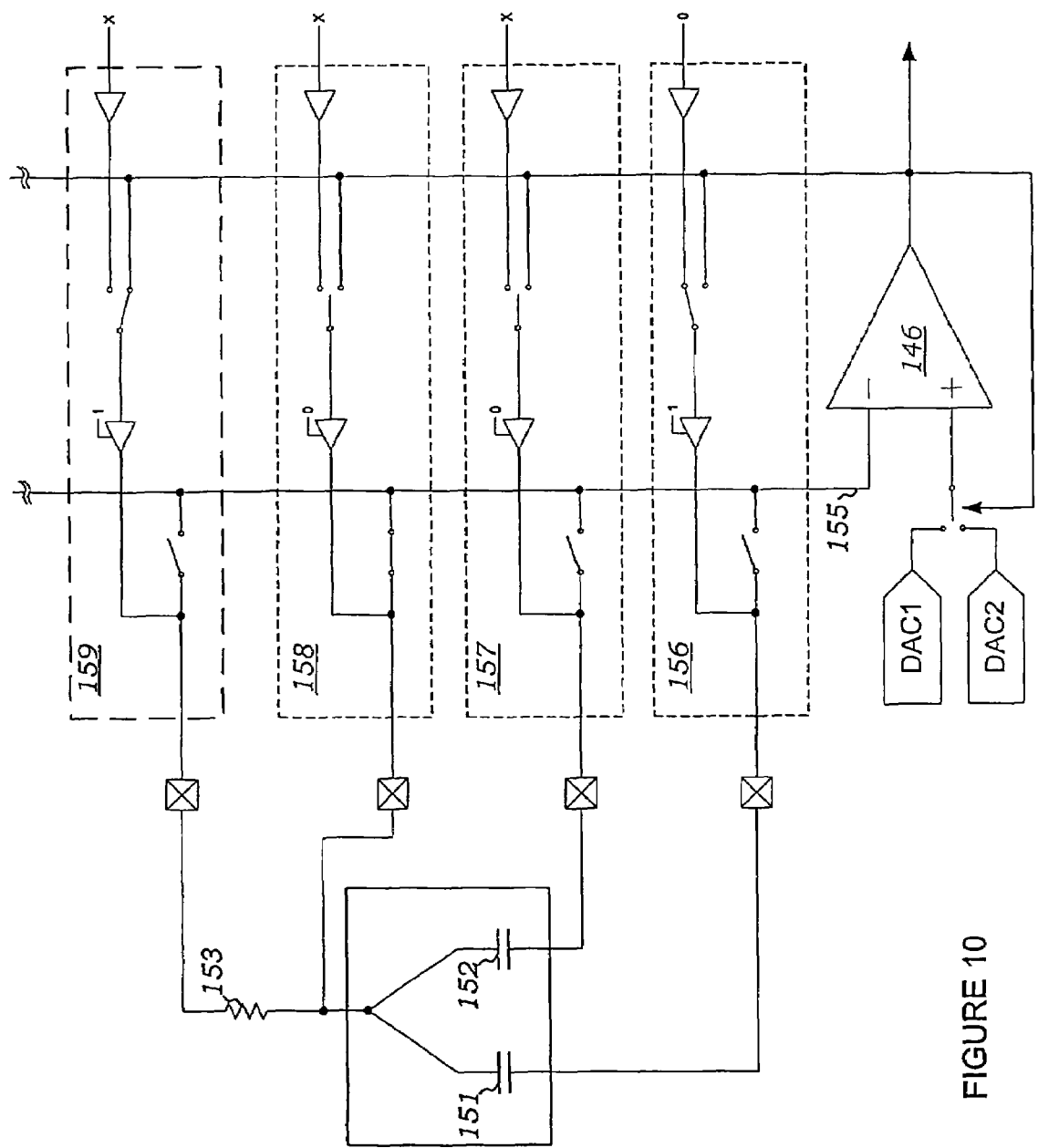
FIG. 10 shows an alternative method of configuring the device I/O channels to a sensor with multiple capacitive sensor elements.

FIG. 10 shows an alternative method of configuring the device I/O channels to a sensor with multiple capacitive sensor elements 151 and 152 which share a single common resistance 153. This topology configures the two capacitors 151 and 152 into an oscillator circuit by alternately grounding one capacitor 151 or 152 and floating the other capacitor 152 or 151. The grounding of or setting of one of the two capacitors, either 151 or 152 to the circuit common is achieved by configuring the 1$^{st}$ Device I/O channels 156 or the 2$^{nd}$ Device I/O channel 157 to the Output Low Mode. The other Device I/O channel is then configured to the High Z Mode so that the capacitance connected to its I/O pin does not electrically connect to the comparator's negative input pin 155 and therefore does not influence the period of oscillator while the other capacitor is presently connected into the oscillator circuit at negative input pin 155 and does influence its oscillation period. FIG. 10 shows the period determining RC network as including 151 and 153 into the oscillator configuration as the 1$^{st}$ Device I/O channel 156 is configured in the High Z Mode, the 2$^{nd}$ Device I/O channel 157 in the High Z mode, the 3$^{rd}$ Device I/O channel 158 in the Sense Input Mode, and the 4$^{th}$ Device I/O channel 159 is configured in the Oscillator Output Mode.

FIGS. 11A, 11B, 11C and 11D illustrate the ability to control the direction of current flow through a sensor network element. A comparator with a ground referenced single power supply in the oscillator configurations shown in this application creates an average DC bias current through the external sensor element. This behavior can be used to supply a magneto-inductive sensor with a bias current, which is necessary to bias the sensor into its quiescent operating point. A magneto-inductive sensor's inductance changes proportionally in response to an applied magnetic field. To ascertain the polarity of the applied magnetic field, the bias current through the sensor can be reversed and the resulting inductive value subtracted from the forward biased reading to obtain the polarity and magnitude information in a manner independent of zero offset temperature drift. The circuits in FIGS. 11A, 11B, 11C and 11D show the two possible current bias directions for a 2-axis magneto-inductive magnetometer circuit using two such sensors by alternating the modes of the four device I/O Channels. The modes are shown in Table 1 below:

TABLE 1

| Mode | L1 Forward Bias | L1 Reverse Bias | L2 Forward Bias | L2 Reverse Bias |
| --- | --- | --- | --- | --- |
| Channel 4 | Oscillator Output | Sense Input | Oscillator Output | Sense Input |
| Channel 3 | Sense Input | Oscillator Output | High Z | High Z |
| Channel 2 | High Z | High Z | Sense Input | Oscillator Output |
| Channel 1 | Sense Input | Sense Input | Sense Input | Sense Input |

Since R1 needs to be connected to alternate sides of L1 and L2 for each of the four configurations, it is permanently connected to channel 1 in the Sense Input Mode and the appropriate side of L1 or L2 for the circuit presently being configured and operated, which must also be actively connected to the negative terminal of the comparator by setting the appropriate channel to the Sense Input mode.

The circuit used in FIGS. 12A and 12B also uses a magneto-inductive magnetic sensor in a bidirectional biased LR oscillator configuration to extract the sensor's signal. The FIGS. 12A and 12B circuit can also be used with almost any type of inductive sensor as it is not only limited to magneto-inductive sensors. The FIGS. 12A and 12B circuit can drive higher bias currents more accurately than the FIGS. 11A, 11B, 11C and 11D circuit because the main current flow does not flow through any analog switch structures, namely the Input Selector switches, which typically are not as conductive as logic level drivers. One of the advantages of this circuit is that many magneto-inductive sensor circuits on the market today are connected with resistors 206 and 208 on both ends of the magneto-inductive sensor 207, so for those cases using this arrangement would simplify customer adoption of the present invention. In the circuit shown in FIGS. 12A and 12B, the device I/O Channels 1 and 4 (201 and 204) alternate within the roles of being the Oscillator Output and the active electrical ground (Output Low mode) of the circuit, while Channels 2 and 3 (202 and 203) alternate within the roles of sensing the signal (Sense Input) and being open circuit (High Z mode). A state table of Channel modes is given below in Table 2:

TABLE 2

| Mode | 12A 207 Forward Biased | 12B 207 Reverse Biased |
| --- | --- | --- |
| Channel 4 | Oscillator Output | Output Low |
| Channel 3 | High Z mode | Sense Input |
| Channel 2 | Sense Input | High Z |
| Channel 1 | Output Low | Oscillator Output |

The FIGS. 12A and 12B circuit can also be expanded to serve multiple sensors by adding additional channels with some of these device I/O channels being shared among multiple sensors, for example the three axes (X, Y and Z) of an inductive magnetometer's axes.

FIGS. 13A and 13B uses the same circuit elements as FIGS. 12A and 12B and will use the same figure numbers in an alternative manner for attaching magneto-inductive magnetic sensors or any other inductive sensor. It employs the same circuitry as shown in FIGS. 12A and 12B but does not use resistor 206 within the current path, which will reduce the losses and increase the gain of the circuit. This is because the single resistor value would have to be doubled in value to produce the same amount of current through magneto-inductive sensor 207. Since the sense input 210 side of comparator 209 (the negative side) senses the IR product of resistor 208 (voltage) the amplitudes here will double and hence the signal to noise ratio will improve. In the circuit shown in FIGS. 13A and 13B, the $2^{nd}$ Device I/O channel 202 and the $3^{rd}$ Device I/O channel 203 alternate roles of being the Oscillator Output and Sense Input, while the $1^{st}$ Device I/O channel 201 and the $4^{th}$ Device I/O channel 204 alternate the roles of actively electrically grounding (Output Low mode) and being electrically open circuit (High Z mode). A state table of Channel modes is given below in table 3:

TABLE 3

| Mode | 13A 207 Forward Biased | 13B 207 Reverse Biased |
| --- | --- | --- |
| Channel 4 | High Z mode | Output Low |
| Channel 3 | Oscillator Output | Sense Input |
| Channel 2 | Sense Input | Oscillator Output |
| Channel 1 | Output Low | High Z |

The circuit of FIG. 13 can be expanded by adding additional channels to serve multiple sensors with some of the device I/O channels being shared among multiple sensors or sensor's axes.

The circuit illustrated in FIG. 14 is an example of an implementation of multiple sensors of mixed types. This circuit as shown could be used in a three axis tilt-compensated compass application, where a minimum of three axes of magnetic field information (X, Y and Z) and two axes of acceleration information for pitch and roll calculations (X and Y) are required. The sensors' lag network circuits are L1/R1 301, 311; L2/R1 302, 311; L3/R1 303, 311; R2/C1 304, 309; R2/C2 304, 308; R2/C3 304, 307 and R2/C4 304, 306. The three magnetometers L1, L2 and L3 (301, 302 and 303) and R2 304 are able to share a common channel 320 on one side because their current paths can still be individually conducted through channels 321 through 324. A state table of Channel modes is given below in Table 4:

TABLE 4

| Mode | L1F | L1R | L2F | L2R | L3F |
| --- | --- | --- | --- | --- | --- |
| CH 10 | OO | SI | OO | SI | OO |
| CH 9 | SI | OO | | | |
| CH 8 | | | SI | OO | |
| CH 7 | | | | | SI |
| CH 6 | | | | | |
| CH 5 | | | | | |
| CH 4 | | | | | |
| CH 3 | | | | | |
| CH 2 | | | | | |
| CH 1 | SI | SI | SI | SI | SI |

| Mode | L3R | R2C1 | R2C2 | R2C3 | R2C4 |
| --- | --- | --- | --- | --- | --- |
| CH 10 | SI | OO | OO | OO | OO |
| CH 9 | | | | | |
| CH 8 | | | | | |
| CH 7 | OO | | | | |
| CH 6 | | SI | SI | SI | SI |
| CH 5 | | | | | SI |
| CH 4 | | | | SI | |
| CH 3 | | | SI | | |
| CH 2 | | SI | | | |
| CH 1 | SI | | | | |

Where:
CH x = Channel x
L1F = L1 forward biased
L1R = L1 reverse biased.
L2F = L2 forward biased
L2R = L2 reverse biased.
L3F = L3 forward biased
L3R = L3 reverse biased.
OO = Oscillator Output Mode
SI = Sense Input Mode
Blank cell = High Z Mode FIGS. 15A, 15B, 15C, 15D and 15E show how the circuit of the present invention can be configured for a voltage-mode sensor, such as a piezo material based sensor element, to modulate the oscillator frequency thereby providing the equivalent of a standard Analog to Digital Conversion (ADC) function. The voltage source 403 shown in FIG. 15A can either be a signal directly from a sensor's output or a buffered and processed derivative of the sensor's signal. Two arrangements are shown. The first configuration, which is shown in FIG. 15A modifies the voltage of the DAC input offset bias 401. This modulates the oscillator frequency by changing one of the two comparator threshold voltages, which in turn changes the duration that the output signal from the external lag network 406, 407 takes to deviate between the comparator's two threshold voltages at node 402.

A novel operating extension of the of the present invention disclosed in the FIGS. 15A, 15B, 15C, 15D and 15E circuit is shown in FIG. 15B. In this circuit block, a wheatstone bridge sensor made from four resistors 412, 413, 414 and 415 where one or more resistors is actually a sensor element. Points 416 and 417 are the output voltages of the wheatstone bridge. These feed into components 418 and 419. 418 and 419 can either be DAC's or operational amplifiers with gain and offset. In the case that 418 and 419 are DAC's, the voltage outputs of the wheatstone bridge 416, 417 would feed into the bias or offset input of the DAC's respectively. In the case with respect to 418 and 419 being operational amplifiers, the wheatstone bridge outputs 416 and 417 would feed into the inputs of the two operational amplifiers 418 and 419 (an example of an industry standard general purpose Op-Amp that would suit this function would be the OP07). The Op-Amps and DAC's may need to provide gain and offset to optimize the level and range of the two threshold voltages used by the comparator to create an oscillator with a suitable operating frequency range. The advantage and uniqueness of this configuration is that a bridge sensor element may be measured on a fully differential basis with full time domain common mode noise rejection as two sensor elements simultaneously determine the oscillator frequency. This is opposed to the standard method of multiplexing the comparator for sensors on each separate channel for sequential measurements, in which case noise events occurring at different time intervals in the time domain could not be cancelled out using the commode mode rejection principle of operation.

A third method is shown in FIG. 15C, which has a voltage source 403 impressed upon the signal node 425 of the main RC lag network 406, 407 through a resistor 426. This combination modulates the excitation voltage applied to the lag network thus resulting in a traditional ADC functionality.

A fourth method is shown in FIG. 15D. This circuit topology is configured for an LR 431, 432 lag network and operates in a similar manner as shown in FIG. 15C, but for an inductive oscillator, whereby the voltage source 433 modulates the equivalent excitation voltage to the lag network at node 450.

A fifth method is shown in FIG. 15E which is similar to the disclosure of FIG. 15C, but with the insertion of Sample and Hold circuit blocks 434, 435 and respectively controlled by channels 437 and 436 set in output mode. In this mode the RC network of 406 and 412 are fixed in value and applied in exactly the same manner as in FIG. 15C, except that Sample and Hold circuit blocks 434, 435 are controlled to capture the output voltages at nodes 416 and 417 simultaneously, so that any common mode noise can be differentially rejected. In this implementation, the Sample and Hold outputs from 434, 435 can be sequentially impressed upon node 402 to bias the RC network base frequency so that an ADC conversion can be made at different points in time, but with the result that common mode noise rejection in the time domain can still be achieved. The Sample and Hold circuit blocks 434, 435 can be implemented with discrete components such as a commonly available LF198.

The illustrations in FIG. 16A is a detailed illustration showing common industry standard components required create the equivalent function of the two DAC's 101 and 102 shown FIG. 5. The DAC's 501 and 502 are similar to DAC08 made by several manufacturers with operational amplifiers 503 and 504 on the outputs of DAC's 501 and 502 to convert the current output as provided by these particular DAC's into a voltage output instead. One could use standard OP07 Op-Amps for the operational amplifiers shown.

FIG. 16B illustrates a DAC selector switch 506 made from two DG442 analog switches 507 and 508 and a single 74HC04 inverter gate 509. This selector switch chooses between one of the two DAC switching thresholds (low DAC and high DAC) for the purposes of setting the switching thresholds of the comparator stage as disclosed in FIGS. 5 through 15E.

FIG. 16C shows one possible equivalent circuit for the driver input selector switch 511. The driver 119 shown in FIG. 5 could be a 74HC126 512. The Comparator 103 could be a TLC3702. The buffer 110 could be a 74HC4050. The analog switch 107 could be a DG442. The registers 111-114 and 116, which hold the configuration data transmitted from the Data Communications Bus 121 and drives the appropriate circuitry, could be of type 74AC373. The Data Communications bus could be a variable bit width bus, although they are most typically 8 to 16 bits wide. This data bus can be controlled by a microprocessor or an application specific logical state machine.

FIG. 17A is an illustration of the interleaved sampling method used in the invention to aid in the rejection of common mode noise in addition to eliminating zero bias drift for sensors in wheatstone bridge topologies or sensors where reverse biasing is possible, such as a magneto-inductive magnetic sensors. Interleaved sampling is applied to a sequentially sampled differential pair signals. In FIG. 17A, the multiplexed measured signals 601 and 602 represent the two halves of a sampled differential pair signal. Signal V1 601 is measured when a multiplexer switch 603 is set to the X position while signal V2 602 can be measured at point 604 when switch 603 is in the Y position. As is typical for differential signal pairs, when there is no net signal the differential sum of the pair is zero. When a net signal is impressed upon the pair, the output signals diverge and the differential sum is proportional to the net signal. The signal can be represented mathematically as follows: Net Signal=V1−V2. Also very typical in a sensor and measurement system is the presence of noise. System level noise common to both signals 601 and 602 (common mode noise) is one such noise source. FIG. 17A shows the electrical equivalent model of common mode noise in the form of a voltage source 606 (Vcm). Other types of common mode noise sources include influences such as temperature change, mechanical strain, voltage and current emissions and other external physical sources.

FIG. 17B is the waveform at point 604 when the common mode noise voltage source 606 (Vcm) exerts its influence to signal sources 601 and 602. When two signals have to be measured sequentially as opposed to simultaneously the two samples include the common noise source from two separate and sequential time periods. If the common mode signal 606 (Vcm) were dynamically changing over time as shown in the waveform 607 the differential sum of the signal pairs would include an error voltage equal to the difference of the two average voltages 608 and 609 of the common mode noise voltage 607 during the two separate measurement periods (represented as period X and period Y). This assumes that the measurement converter's 610 (i.e. voltmeter) measured signal is equal to the average voltage over the sample measurement period, such as is the case with an integrating Analog to Digital Converter. The mathematically derived value for the time sequenced differential measurement of sensor signals 601 and 602 (V1 and V2) containing the common mode noise source 606 (Vcm) as measured from point VM 610 is as follows:

$$VM(X)-VM(Y)=Vcm(X)-Vcm(Y)+V1-V2$$

Where VM(X) refers to the configuration when the multiplexer switch in the X position during time period X and VM(Y) refers to the configuration of the multiplexer switch in the Y position during time period Y.

The present invention calls for the sampling method shown in FIG. 17C where the sensor sample is taken in four time periods grouped into two sets. Two X configuration samples are taken and two Y configuration samples are taken in an interleaved manner. This has the effectiveness of reducing the errors created by the common mode voltage source (Vcm) at lower frequencies. As the sample period of each individual sample decreases and the number of samples taken is algebraically summed for the same total time period, the effective cutoff frequency for common mode noise rejection increases. In the Interleaving method, multiple differential samples are taken in succession as shown in FIG. 17C, where each differential period pair's mathematical difference is computed and then algebraically accumulated and displayed on a running basis. This is shown by the formula below.

$$(VM(X1)-VM(Y1))+(VM(X2)-VM(Y2))=(Vcm(X1)-Vcm(Y1))+(Vcm(X2)-Vcm(Y2))+$$

$$(V1(X1)-V2(Y1)+V1(X2)-V2(Y2))$$

Where subscripts 1 and 2 refer to discrete time sets of measurements and X and Y refer to the configuration as described previously.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication detail can be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention applies industrially to sensor platforms, sensor modules, sensor systems and methods. More particularly, the present invention applies industrially to sensors and their commercial applications to Automobiles, Global Positioning Devices, Cell Phones, Laptops, PDA's MP3's, Watches, Consumer Electronics, and Industrial Sensor applications.

What is claimed is:

1. An improved Schmitt trigger oscillator having upper and lower switching thresholds as hysteresis settings for determining the frequency, range of voltage swing, and net DC current flowing through the timing elements, the improvement comprising: a topology having an active DAC, and a comparator wherein the positive comparator input is connected to said DAC for providing a switching threshold on an active basis.

2. An improved Schmitt trigger oscillator as in claim 1 wherein from cycle to cycle, the active DAC provides both the upper switching threshold and the lower switching threshold.

3. An improved Schmitt trigger oscillator as in claim 2, further comprising a state machine controlled switch for determining which of either the high level or low level DAC should be applied as a function of whether the comparator output is high or low and having a completely flexible, user selectable switching threshold for the Schmitt trigger, which can be adjusted on a cycle to cycle basis if desired.

4. An improved Schmitt trigger oscillator as in claim 2, whereby the adjustability of the upper and lower DAC switching thresholds is used on an active basis to modify a sensor's behavior on a cycle-to-cycle basis for allowing use of sensors that exhibit different transfer characteristics in direct response the switching thresholds applied.

5. An improved Schmitt trigger oscillator as in claim 4, further comprising means to arbitrarily control the number of sensor oscillator cycles on one half of a bridge versus the other half for better stability over temperature as well as better common mode rejection of different frequencies of system noise for bridge based sensors, or sensors that are operated in differential mode.

6. An improved Schmitt trigger oscillator as in claim 5, further comprising an accumulator for tracking the resultant difference on any sampled pair from any other pair to be output on a periodic or non-periodic ongoing basis.

7. An improved Schmitt trigger oscillator as in claim 5 further comprising two DAC'S, one for setting the upper Schmitt trigger switching threshold and one for setting the lower Schmitt trigger switching threshold; each DAC having user selectable gain and offset settings such that opposing signal points of a wheatstone bridge sensor configuration can be fed into each one of the two DAC inputs whereby the instantaneous signal from one signal point instantaneously sets the upper switching threshold of the Schmitt trigger oscillator through its DAC, while simultaneously, the other signal point of the wheatstone bridge sets the lower switching threshold of the Schmitt trigger through its DAC thereby achieving true common mode operation in a frequency based operation mode.

8. An improved Schmitt trigger oscillator as in claim 2, further comprising a gain/buffer stage to be present within the Schmitt trigger oscillator loop such that the voltage seen across the sensor element is minimized, while still allowing the Schmitt trigger to generate the swing thresholds necessary to produce a large frequency variance over the desired measurement range for accepting sensors which exhibit piezo and inverse-piezo effects when a voltage or current signal is applied for excitation prior to signal extraction in order to boost the sensor's signal to noise ratio performance.

9. An improved Schmitt trigger oscillator having upper and lower switching thresholds as hysteresis settings for determining the frequency, range of voltage swing, and net DC current flowing through the timing elements, the improvement comprising:
a topology having an active DAC, a comparator wherein the positive comparator input is connected to said DAC for providing a switching threshold on an active basis,
wherein from cycle to cycle, the active DAC provides both an upper switching threshold and a lower switching threshold,
whereby the adjustability of the upper and lower DAC switching thresholds is used on an active basis to modify a sensor's behavior on a cycle-to-cycle basis for allowing use of sensors that exhibit different transfer characteristics in direct response the switching thresholds applied, means to arbitrarily control the number of sensor oscillator cycles on one half of a bridge versus the other half for better stability over temperature as well as better common mode rejection of different frequencies of system noise for bridge based sensors, or sensors that are operated in differential mode, and two DAC's, one for setting the upper Schmitt trigger switching threshold and one for setting the lower Schmitt trigger switching threshold; each DAC having user selectable gain and offset settings such that opposing signal points of a wheatstone bridge sensor configuration can be fed into each one of the two DAC inputs whereby the instantaneous signal from one signal point instantaneously sets the upper switching threshold of the Schmitt trigger oscillator through its DAC, while simultaneously, the other signal point of the wheatstone bridge sets the lower switching threshold of the Schmitt trigger through its DAC thereby achieving true common mode operation in a frequency based operation mode.

* * * * *